United States Patent
Wu et al.

(10) Patent No.: US 10,699,320 B2
(45) Date of Patent: Jun. 30, 2020

(54) MARKETPLACE FEED RANKING ON ONLINE SOCIAL NETWORKS

(71) Applicant: Facebook, Inc., Menlo Park, CA (US)

(72) Inventors: Wei Wu, Fremont, CA (US); Jiesi Luo, Sunnyvale, CA (US); Lu Zheng, Fremont, CA (US)

(73) Assignee: Facebook, Inc., Menlo Park, CA (US)

( * ) Notice: Subject to any disclaimer, the term of this patent is extended or adjusted under 35 U.S.C. 154(b) by 372 days.

(21) Appl. No.: 15/660,131

(22) Filed: Jul. 26, 2017

(65) Prior Publication Data

US 2019/0034994 A1    Jan. 31, 2019

(51) Int. Cl.
  *G06Q 30/06* (2012.01)
  *G06Q 50/00* (2012.01)
(52) U.S. Cl.
  CPC ......... *G06Q 30/0631* (2013.01); *G06Q 50/01* (2013.01)
(58) Field of Classification Search
  CPC .................................................. G06Q 30/0631
  USPC ....................................................... 705/26.7
  See application file for complete search history.

(56) References Cited

U.S. PATENT DOCUMENTS

| | | | | |
|---|---|---|---|---|
| 2014/0310281 | A1* | 10/2014 | Somekh | G09B 19/00 707/737 |
| 2015/0199772 | A1* | 7/2015 | Sherman | G06Q 30/0643 705/319 |
| 2015/0242750 | A1* | 8/2015 | Anderson | G06F 16/3347 706/50 |
| 2017/0024391 | A1* | 1/2017 | Steck | G06F 16/24578 |
| 2017/0031920 | A1* | 2/2017 | Manning | G06F 16/904 |

* cited by examiner

*Primary Examiner* — Alexis M Casey
(74) *Attorney, Agent, or Firm* — Baker Botts L.L.P.

(57) ABSTRACT

In one embodiment, a method includes, receiving a request, from a client system of a first user, to access a marketplace including products offered for sale by a second user. The method includes, by the computing device, filtering a set of product listings based on multiple respective product-listing embeddings and a content-interaction embedding associated with the first user. Each product listing includes a description of one of the products in the marketplace. The method includes ranking each product listing in the filtered set based at least on a product-score representing a likelihood of the first user interacting with the respective product. The product-score is based on interaction information associated with the first user, product information associated with the product, and sparse information associated with the first user. The method includes sending, to the client system of the first user, a subset of the ranked product listings.

20 Claims, 13 Drawing Sheets

MARKETPLACE FEED RANKING ON ONLINE SOCIAL NETWORKS

TECHNICAL FIELD

This disclosure generally relates to online marketplaces.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

SUMMARY OF PARTICULAR EMBODIMENTS

In particular embodiments, the marketplace may include product listings showing products or services for sale near the user. Each product listing comprises a description one of the products in the marketplace. Certain embodiments include systems and methods to provide the most relevant product listings available near a user to avoid overwhelming the user with many or irrelevant product listings. To improve the efficiency of providing the relevant product listings, a two-stage system may be used. The first stage may be a filter that uses embeddings of vector representations of the product listings and an interaction history associated with the user embeddings to reduce the size of the product inventory by filtering out product-listings determined likely to not be relevant to the user. The first stage may access a set of product listings, including the most recent product listings created near a user, and filter the set down to a manageable number of products by determining a similarity function the product listing embeddings nearest the user-interaction history embedding in an embedding space. The second stage may be a ranking component that receives the filtered set of product listings output from the first stage and uses a plurality of scoring signals to create a ranked list from the filtered set of product listings. The ranking may be determined based on a goal of maximizing user interaction with the items. The social-networking system may send the ranked list of product listings to the user.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
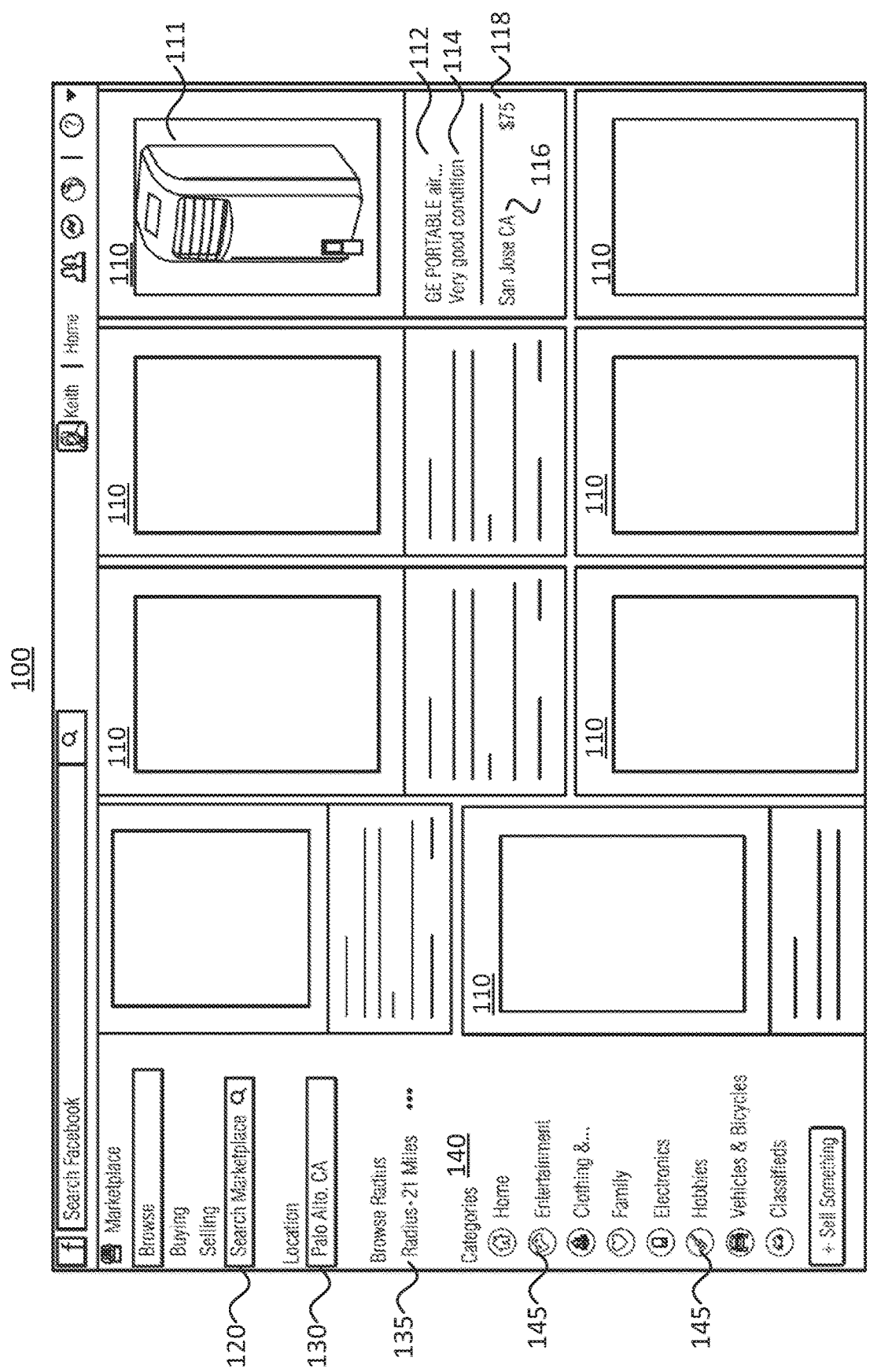
FIG. 1 illustrates an example marketplace of an online social network.

In particular embodiments, an online social network may provide a marketplace where products or services may be offered for sale or trade. The marketplace may include products or services offered by a variety of entities, for example, the users of the online social network, the provider of the online social network, third-party businesses or other entities advertising through the online social network, or other suitable entities. The marketplace may include product listings with descriptions of the products offered for sale. To encourage users to interact with the products and product listings, a social-networking system may show product listings on a personalized or customized basis to users accessing the marketplace. The social-networking system may show product listings to a user that are determined to be relevant to the user. The social-networking system may show product listings to the user that have been determined to have a higher calculated likelihood or probability of the user interacting with the product listings.

In particular embodiments, the marketplace may include product listings showing products or services for sale near the user. As used herein, "products" refers to products, goods, services, or similar, of any nature. A "product listing" comprises a description of one of the products in the marketplace. Particularly in highly populated areas, the number of product listings in the marketplace near a user (i.e., in the user's "product inventory") can be quite high. In some areas more than 5000 product listings may be submitted every day. It would be impractical and difficult for the user to look through all of the product listings each day to determine whether or not they are interested. Therefore, systems and methods are needed to provide the most relevant product listings available near the user to avoid overwhelming the user with many or irrelevant product listings. Because the number of product listings for each user's product inventory can be so large, it may be difficult to provide an effective and computationally efficient system for determining which product listings to show to each user accessing the marketplace at any given time. To improve the efficiency of this determination, a two-stage system may be used. The first stage may be a filter that reduces the size of the product inventory by filtering out product-listings determined likely to not be relevant to the user. The first stage may take a set of product listings including the most recent product listings created near a user and filter the set down to a manageable number. For example, the first stage may receive the 2000 most recent product listings and filter the set to the 500 product listings considered to be most relevant to the particular user accessing the marketplace. The second stage may be a ranking component that receives the filtered set of product listings output from the first stage and uses a plurality of scoring signals to create a ranked list from the filtered set of product listings. The ranking may be determined based on a goal of maximizing user interaction with the items. The social-networking system may send the ranked list of product listings to the user.

In particular embodiments, the social-networking system may receive a request, from a client system of a first user of an online social network, to access a marketplace comprising a plurality of products offered for sale by a second user of the online social network. An online social network may comprise many features and sections directed to facilitating different kinds of interactions between the users and other entities of the online social network. As an example, a social-networking system may provide features allowing a user to communicate, publically or privately, with other users of the online social network. As another example, a social-networking system may provide a marketplace section wherein a user may view product listings corresponding to products offered for sale by one or more users or other entities on the online social network. A product listing may include content relevant to the sale of the product represented by the product listing such as a title, a text description, a requested asking price, one or more images of, or relevant to, the product, one or more geographical locations associated with the product, an identity of the seller of the product, any other suitable information, or any combination thereof. In particular embodiments, a user may request to access a marketplace provided by the online social network by navigating to the marketplace section of the online social network using a web browser or an application provided by the social-networking system available on a client system of the first user. In particular embodiments, a user may request to access the marketplace by launching a standalone application provided by the operator of the social-networking system designed to facilitate access the marketplace. Although this disclosure describes receiving a request to access a marketplace in a particular manner, this disclosure contemplates receiving a request to access a marketplace in any suitable manner.

In particular embodiments, after receiving the request to access the marketplace, the social-networking system may retrieve a collection of product listings for the first user. The retrieval of product listings may be based on factors such as geographic location, age of posting, time of day, any other suitable factor, or any combination thereof. As an example, and not by way of limitation, the social-networking system may determine a geographic location to associate with the first user. The geographic location may be based on the current location of the user as determined by the client system of the first user, check-in information, information associated with a profile of the first user such as the user's hometown or current affiliated location, a cached location associated with the user, any other suitable basis, or any combination thereof. The social-networking system may retrieve product listings in geographic proximity to the first user. Product listings being in geographic proximity to the first user may be preferred because proximity may help ensure that the owner of the product listing will be within range of the first user if the first user decides to interact with the seller and purchase the product. In particular embodiments, the social-networking system may provide an input wherein the first user may determine an acceptable distance for the products. As an example, and not by way of limitation, the user may input that they would like to see products up to 25 miles away from their current location. As another example and not by way of limitation, the social-networking system may determine a maximum time elapsed since creation (i.e., age) of the product listing to retrieve for the first user. The social-networking system may retrieve product listings with less than a specific age to increase the likelihood that the product is still available. In particular embodiments, the social-networking system may provide an input allowing a user to specify an acceptable maximum age of a product listing. In particular embodiments, the social-networking system may determine a threshold number of product listings to retrieve. If the number of product listings retrieved using the determined settings of the factors for retrieving product listings fails to satisfy the threshold number, the social-networking system may adjust the settings of the factors accordingly to increase the number of product listings retrieved. Although this disclosure describes retrieving product listings in a particular manner, this disclosure contemplates retrieving product listings in any suitable manner.

FIG. 1 illustrates an example marketplace of an online social network. The marketplace 100 contains a plurality of product listings 110 corresponding to a plurality of respective products. The marketplace 100 contains various ways for a user to interact with the product listings. By browsing the marketplace 110, the user is able to view the product listings 110. The user is able to view an image 111 associated with a product. The user is able to view text components of the product listing, such as a title 112 or text description 114. The user may be able to view a geographic location 116 and price 118 associated with the product. The marketplace 100 contains an input 120 allowing a user to search for specific product listings. In the example view of the marketplace 100 in FIG. 1, the user has been associated with Palo Alto, Calif. as their geographic location. In this example, the location has been determined automatically based on the geographic location of the user's client system. In particular embodiments, the user may be able to change the location associated with the user via an input 130. The user may be able to view and change the maximum acceptable distance of a product listing from their geographic location. In this example, a distance of 21 miles has been selected, and the user may change this selection by interacting with a user interface element 135. The marketplace may also contain a collection 140 of elements allowing a user to select one or more categories 145 of product listings to browse. By interacting with a particular product listing 110, the user may be able to view additional information. In particular embodiments, the user interface may be intentionally designed for viewing on a large format or high resolution screen, or on a small screen, such as with a handheld mobile client system. Although this disclosure describes and illustrates a marketplace user interface in a particular manner, this disclosure contemplates any suitable manner of displaying a marketplace to a user.

Figure 2:
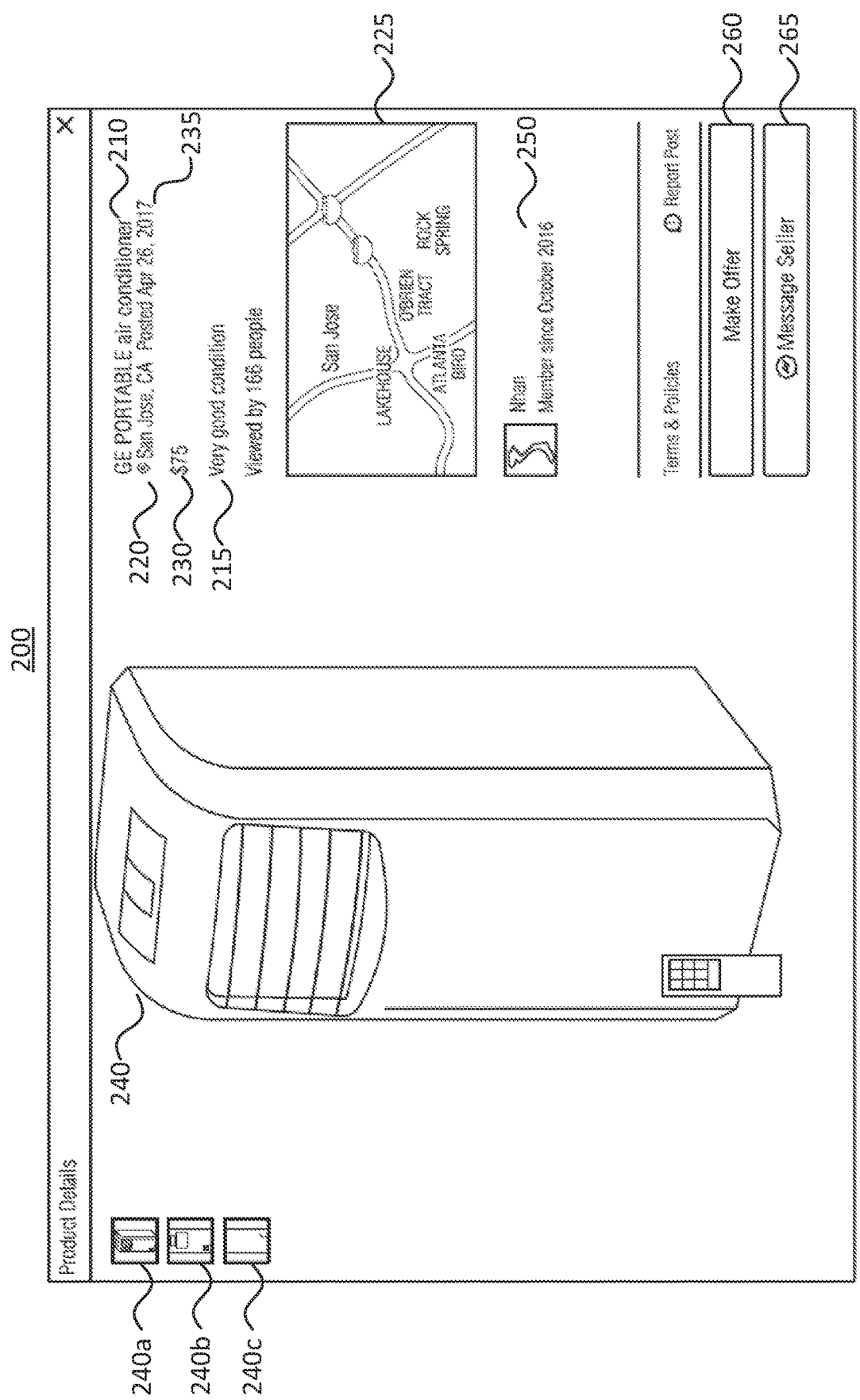
FIG. 2 illustrates an example product listing in an example marketplace.

FIG. 2 illustrates an example view of single product listing 200. By interacting with the product listing 110 in the marketplace 100, the user may access a detailed view of the product listing 200. The detailed product listing 200 may allow the user to view an expanded title 210 and text description 215 of the product listing. The detailed product listing may contain a coarse location 220 such as the name of the city associated with the product listing. In the example product listing 200, the coarse location 220 is "San Jose, Calif." The product listing 200 may also include a map 225 showing an approximation of the geographic location associated with the product listing. This may allow the user to determine with greater detail the geographic location associated with the product listing. The detailed product listing may include an asking price 230 for the product, the age 235 of the product listing, and information about the seller 250 associated with the product listing. The product listing may enable various ways for an interested user to contact the seller, such as by making an offer directly through a user interface element 260, or by messaging the seller through a user interface element 265. The detailed product listing may allow the user to view a main image 240 associated with the product listing, as well as one or more secondary images 240*a*, 240*b*, and 240*c* if designated by the seller. Although this disclosure describes and illustrates a product listing in a particular manner, this disclosure contemplates any suitable manner of displaying a product listing to a user.

In particular embodiments, the social-networking system may filter a set of product listings based on a plurality of respective product-listing embeddings and a content-interaction embedding associated with the first user. The filtering may be performed by a personalized retrieval model designed or trained to filter the set of retrieved product listings for the first user on a personal basis, based in part on specific features for or characteristics of the first user. In particular embodiments, the personalized retrieval model may comprise one or more machine-learning-generated models. A machine learning module may train models to map product listings to product-listing embeddings. A model may be trained to map content of product-listings to vector representations. The model may be trained to map other relevant information related to product listings to vector representations. A second machine-learning module may train models to map user content interaction histories to content-interaction embeddings. The second machine learning module may train models to map demographic information, text-interaction history, image-interaction history, other relevant information, or any combination thereof to vector representations, as described herein. In particular embodiments, one or more machine-learning-generated models may include a dictionary 300A trained to map text to vector representations. One or more machine-learning-generated models may also include a dictionary 300B trained to map images to vector representations. One or more machine-learning-generated models may include a dictionary 300C trained to map demographic components to vector representations. Dictionaries 300A, 300B, and 300C are described in connection with FIGS. 3A-3C.

Figure 3A:
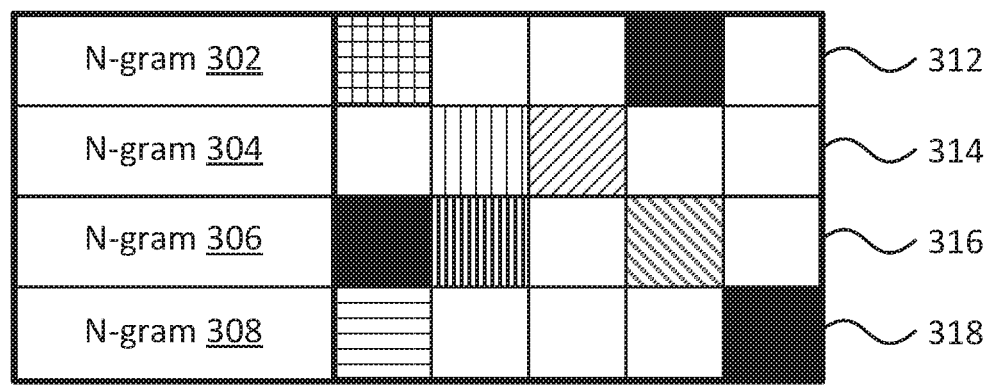
FIG. 3A illustrates an example dictionary mapping n-grams to vector representations.
Figure 3B:
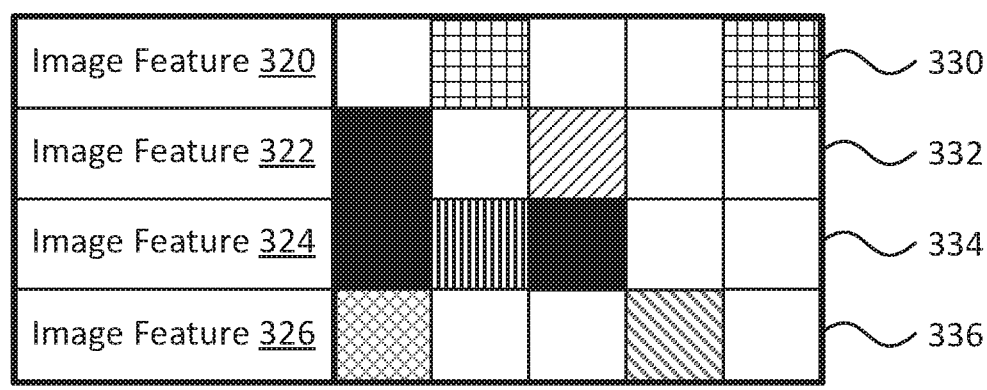
FIG. 3B illustrates an example dictionary mapping image features to vector representations.
Figure 3C:
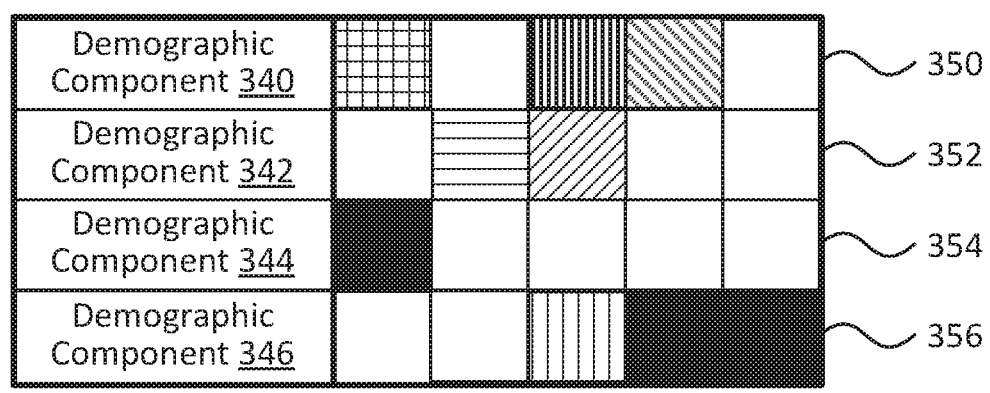
FIG. 3C illustrates an example dictionary mapping demographic components to vector representations.

FIG. 3A illustrates example dictionary 300A mapping n-grams 302, 304, 306, and 308 to vector representations 312, 314, 316, and 318. FIG. 3B illustrates example dictionary 300B mapping image features 320, 322, 324, and 326 to vector representations 330, 332, 334, and 336. FIG. 3C illustrates example dictionary 300C mapping demographic components 340, 342, 344, and 346 to vector representations 350, 352, 354, and 356. In particular embodiments, dictionaries 300A, 300B, and 300C may be generated by social-networking system. In particular embodiments, dictionaries 300A, 300B, and 300C may map respective n-grams, image features, and demographic components to vectors in $\mathbb{R}^d$, where $\mathbb{R}$ denotes the set of real numbers and d is a hyper-parameter that controls capacity. Vector representations 312, 314, 316, 318, 330, 332, 334, 336, 350, 352, 354, and 356 may be d-dimensional intensity vectors. For illustrative purposes and not by way of limitation, the intensity values in example vector representations 312, 314, 316, 318, 330, 332, 334, 336, 350, 352, 354, and 356 are depicted as patterns in FIGS. 3A-3C. For example, dictionary 300A maps n-gram 302 to vector representation 312, which is illustrated as the top row of cells of various patterns, adjacent to n-gram 302, in dictionary 300A. Similarly, dictionary 300B maps image feature 320 to vector representation 330, which is illustrated as the top row of cells of various patterns, adjacent to image feature 320, in dictionary 300B. Dictionary 300C maps demographic component 340 to vector representation 350, which is illustrated as the top row of cells of various patterns, adjacent to demographic component 340, in dictionary 300C. Although dictionaries 300A, 300B, and 300C are depicted as being particular sizes (i.e., dimensions), this is merely illustrative, not by way of limitation. Dictionaries 300A, 300B, and 300C may be of any suitable sizes. Dictionary 300A may provide mappings between any suitable number of n-grams and vector representations, dictionary 300B may provide mappings between any suitable number of image features and vector representations, and dictionary 300C may provide mappings between any suitable number of demographic components and vector representations. Although this disclosure describes and illustrates generating vector representations of objects in a particular manner, this disclosure contemplates any suitable manner of generating vector representations of objects.

In particular embodiments, the social-networking system may generate one or more product-listing embeddings associated with one or more product listings, respectively, based on content associated with each of the respective product listings. As an example, and not by way of limitation, the content associated with each product listing may comprise one or more text items, one or more images, one or more location items, one or more categories, any other suitable items, or any combination thereof. As an example, and not by way of limitation, social-networking system may generate a product-listing embedding for a particular product-listing by generating vector representations of the content associated with the product-listing. Social-networking system may generate a product-listing embedding for a particular product-listing by generating a vector representation of the text items associated with the particular product listing. The social-networking system may parse the one or more text items associated with the particular product listing into one or more n-grams. The social-networking system may map each n-gram of the text items to a vector representation (e.g., with the use of a dictionary such as dictionary 300A). The social-networking system may combine the vector representations of the n-grams to form a vector representation of the text items. In particular embodiments, the content associated with each product listing may comprise one or more images. As an example, and not by way of limitation, the social-networking system may generate a product-listing embedding for a particular product listing by generating a vector representation of the images associated with the particular product listing (e.g., with the use of a dictionary such as dictionary 300B). Generating the vector representation may comprise analyzing the image and performing feature recognition on the one or more images associated with the particular product listing. As further described below, in particular embodiments, the social-networking system may combine the vector representations of the one or more images into a vector representation of the collection of images. In particular embodiments, the social-networking system may similarly generate a vector representation of other items included in a product listing. The social-networking system may combine the vector representations of the text items, the vector representations of the one or more images, and the vector representations of the other items, or any combination thereof, to form a vector representation of the product listing. The social-networking system may determine coordinates for a point in an embedding space of product listings based on the vector representation of the product listing. Although this disclosure describes generating product-listing embeddings in a particular manner, this disclosure contemplates generating product-listing embeddings in any suitable manner.

Figure 4A:
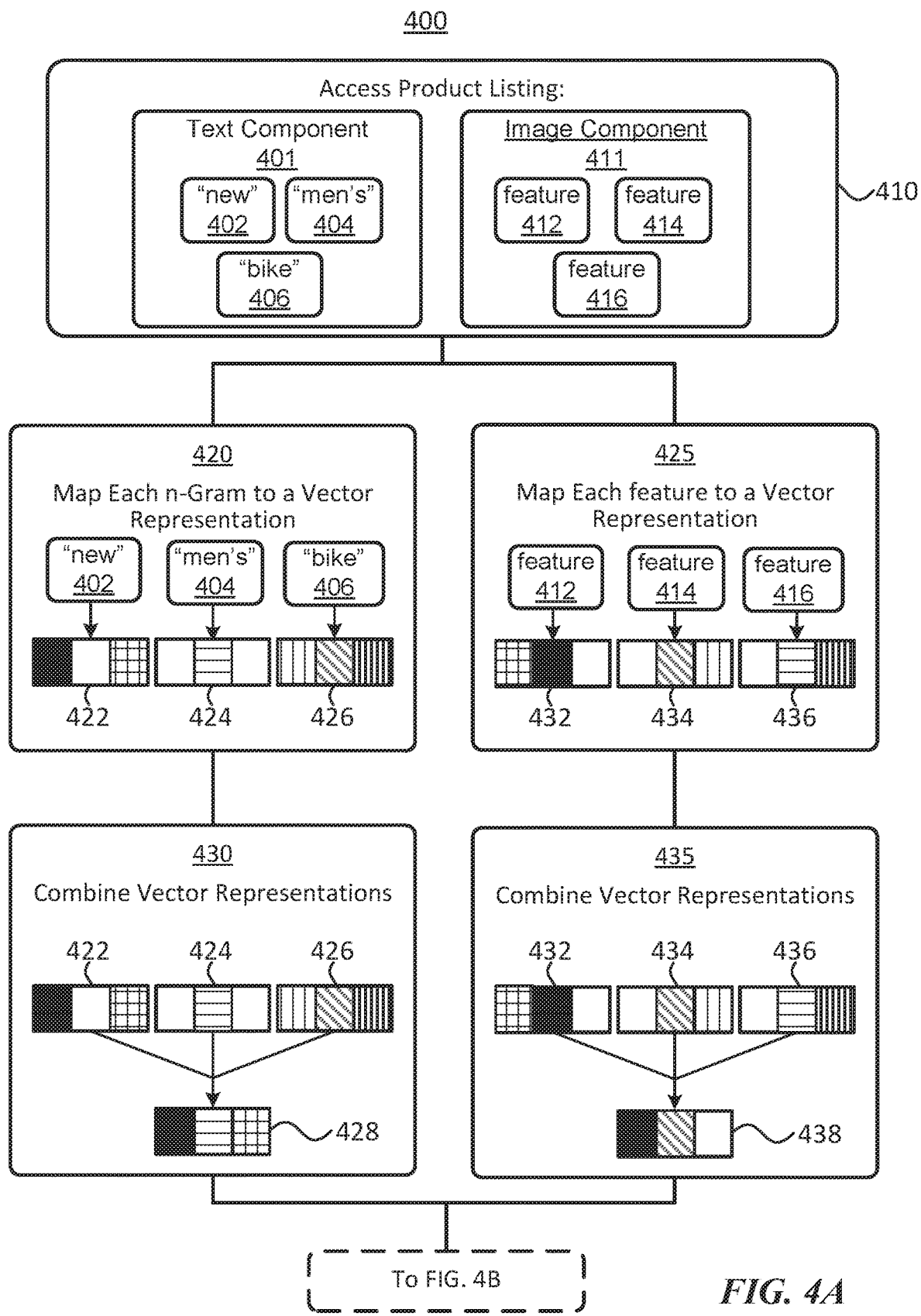
FIGS. 4A-4B illustrate an example method for determining an embedding of a product listing.
Figure 4B:
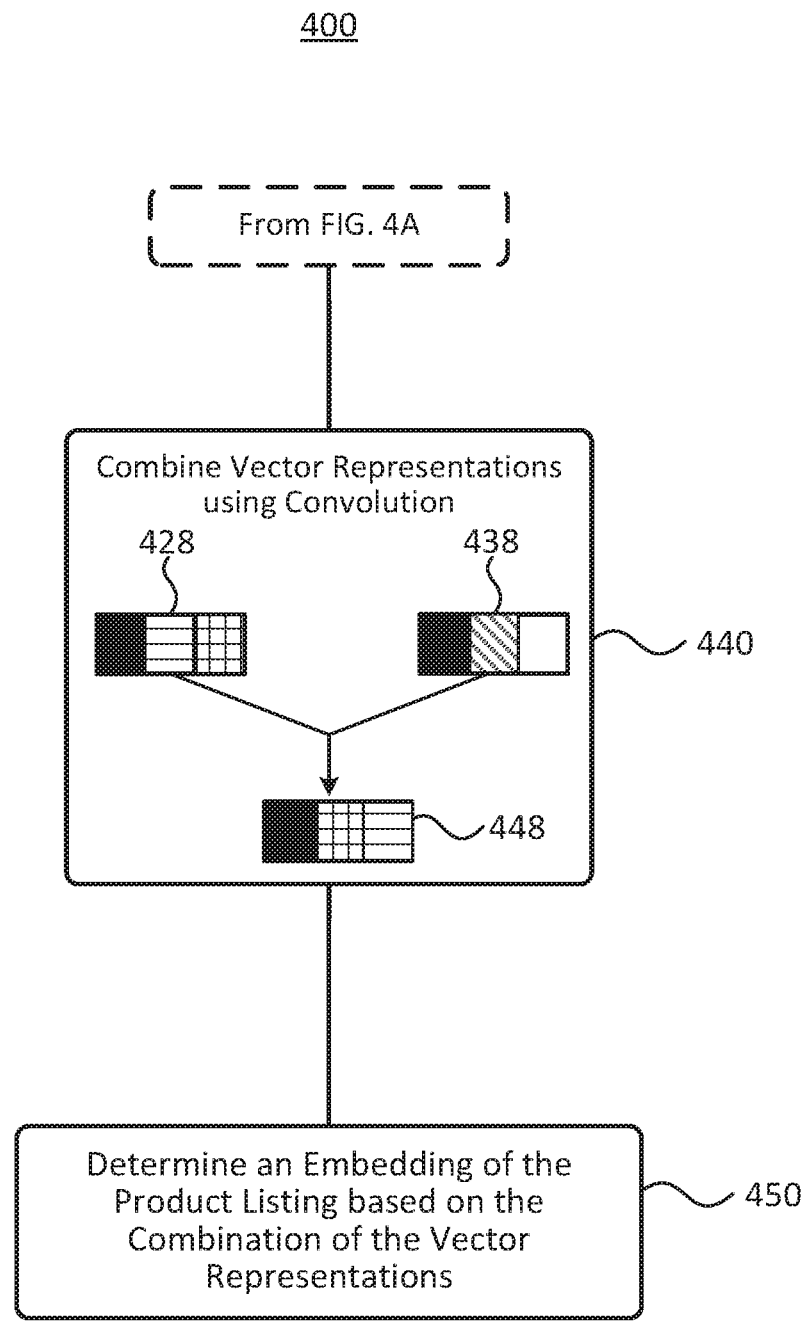

FIGS. 4A-4B illustrate an example method 400 for determining an embedding of a product listing using a machine-learning-generated model. At step 410, a product-listing may be accessed. The product-listing may include any suitable amount of content. The content may include any suitable number of text components, images, geographical locations, categories, or other suitable content. In the illustrated example of FIG. 4A, the product-listing includes a text component 401 consisting of three n-grams "new" 402, "men's" 404, and "bike" 406 and an image component 411 consisting of three features 412, 414, 416.

At step 420, social-networking system may map the text component to three vector representations (i.e., one for each n-gram), using, for example, dictionary 300A, which is generated using the machine-learning-generated model. Each n-gram 402, 404, and 406 may be mapped to a respective vector representation 422, 424, and 426, as described above in connection with FIG. 3A. In particular embodiments, certain words of a text query (e.g., pronouns, prepositions, conjunctions, or any other words not significantly contributing to the meaning of the text query) may be disregarded.

At step 425, social-networking system may map the image component to three vector representations (i.e., one for each image feature), using, for example, dictionary 300B, which is generated using the machine-learning-generated model. Each image feature 412, 414, and 416 may be mapped to a respective vector representation 432, 434, and 436, as described above in connection with FIG. 3B.

At step 430, vector representations 422, 424, and 426 may be combined. Any suitable technique may be used to combine vector representations 422, 424, and 426 into a single vector representation 428, including, as an example and not by way of limitation, convolution, averaging, any other suitable non-linear combination technique, any other suitable technique, or any combination thereof. In the illustrated example of FIG. 4A, social-networking system performs a convolution of the three vectors 422, 424, and 426 (e.g., a 3-tap convolution) and then a max pooling operation to yield one vector representation 428 of the text component. At step 435, vector representations 432, 434, and 436 may be combined similarly combined to yield one vector representation 438 of the image component.

Moving to FIG. 4B, at step 440, vector representations 428 and 438 may be combined. Any suitable technique may be used to combine vector representations 428 and 438 into a single vector representation 448, including the techniques described above. In the illustrated example of FIG. 4B, social-networking system performs a convolution of the two vectors 428 and 438 to yield one vector representation 448 of the product listing.

At step 450, an embedding of the product listing may be determined based on the vector representation 448 of the product listing. In particular embodiments, social-networking system may determine an embedding of the product listing based on the vector representation 448. As used herein, an embedding of a product listing may refer to a representation of the product listing in an embedding space based on the combined vector representation 448 of the text component and image component. Coordinates for a point in an embedding space may be determined based on vector representation 448 of the product listing. In particular embodiments, the machine-learning-generated model may be used to generate a plurality of product-listing embeddings. Each of these product-listing embeddings may be based on a respective vector representation that corresponds to a particular point in an embedding space. An example embedding space is depicted in and described in connection with FIG. 6 below.

Although this disclosure describes and illustrates particular embodiments of FIGS. 4A-B as being implemented by social-networking system, this disclosure contemplates any suitable embodiments of FIGS. 4A-B occurring on any suitable interface and as being implemented by any suitable platform or system. As an example, and not by way of limitation, particular embodiments of FIGS. 4A-B may be implemented by client system 130 or third-party system 170. Furthermore, although this disclosure describes and illustrates particular components, devices, or systems carrying out particular steps of the method of FIGS. 4A-B, this disclosure contemplates any suitable combination of any suitable components, devices, or systems carrying out any suitable steps of the method of FIGS. 4A-B. Although this disclosure describes and illustrates particular steps of the method of FIGS. 4A-B as occurring in parallel or in a particular order, this disclosure contemplates the particular steps of FIGS. 4A-B occurring in any suitable order with or without steps occurring in parallel.

In particular embodiments, the social-networking system may generate a content-interaction embedding associated with the first user based on a content interaction history associated with the first user. The content-interaction embedding may represent a frequency and nature of interactions by the user with a variety of product listings. The content-interaction embedding may be based on a content interaction history associated with the first user. The content interaction history may comprise demographic information associated with the first user, an image interaction history associated with the first user, or a text interaction history associated with the first user. The demographic information associated with the first user may comprise a plurality of demographic components and be retrieved from social networking information stored on the online social network. The demographic information may be derived from social networking information stored on the online social network. As an example and not by way of limitation, the demographic information associated with the first user may be used to determine a likelihood of the user interacting with certain product listings. The image interaction history associated with the first user may comprise records of the images associated with product listings with which the user has previously interacted over one or more time periods. The image interaction history may be a collection of images, a collected of representations of images, a collection of features of the images, any other suitable format, or any combination thereof. The text interaction history may be a collection of text items associated with product listings with which the user has previously interacted. The text interaction history may comprise full text items of the product listings, n-grams associated with or extracted from the text items of the product listings, vector representations of the text items or n-grams, any other suitable format, or any combination thereof.

In particular embodiments, the social-networking system may generate vector representations of the demographic information associated with the first user (e.g., with the use of a dictionary such as dictionary 300C), the text interaction history associated with the first user (e.g., with the use of a dictionary such as dictionary 300A), the image interaction history associated with the first user (e.g., with the use of a dictionary such as dictionary 300B), any other component of the content interaction history, or any combination thereof. As further described herein, the social-networking system may combine the vector representations to form a vector representation of the content interaction history associated with the first user. The social-networking system may determine coordinates for a point in an embedding space of content-interaction embeddings based on the vector representation of the content interaction history. In particular embodiments, the embedding space of content-interaction embeddings may be related to the embedding space of product listings such that the content-interaction embeddings and product-listing embeddings may easily be compared. For example the embedding space of content-interaction embeddings may intersect, overlap, coexist, map to, or otherwise relate to the embedding space of product-listing embeddings or vice versa. Although this disclosure describes generating content-interaction embeddings in a particular manner, this disclosure contemplates generating content-interaction embeddings in any suitable manner.

Figure 5A:
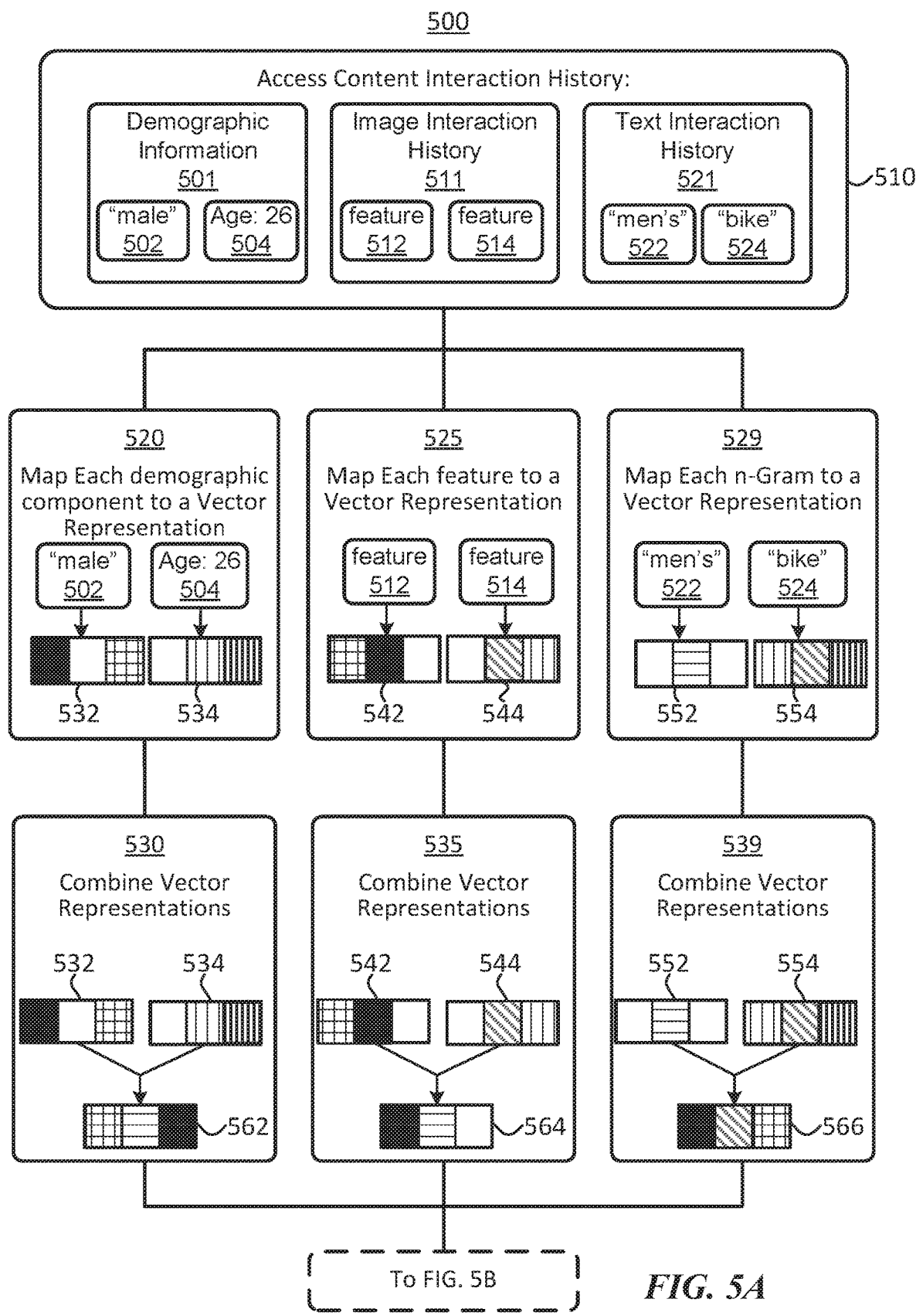
FIGS. 5A-5B illustrate an example method for determining an embedding of a content interaction history.
Figure 5B:
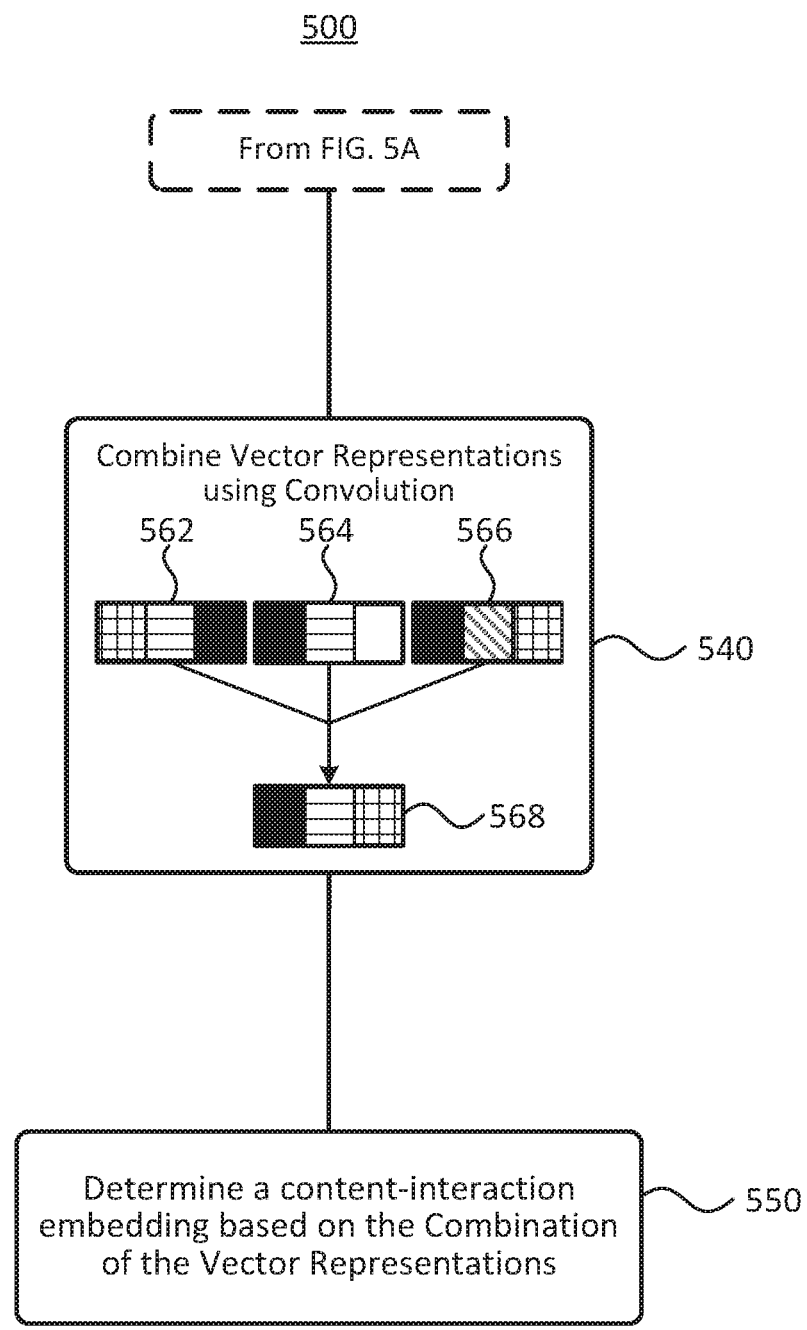

FIGS. 5A-5B illustrate an example method 500 for determining a content-interaction embedding associated with a particular user using a machine-learning-generated model. At step 510, a content interaction history may be accessed. The content interaction history may include any suitable content. The content may include any suitable number of demographic components (i.e from user demographic information), any suitable number of image features (i.e., from an image-interaction history), n-grams (i.e., from a text-interaction history), or other suitable data. In the illustrated example of FIGS. 5A-5B, the content interaction history includes demographic information 501 consisting of the user's sex "male" 502 and age "26" 504, an image interaction history 511 consisting of two image features 512 and 514, and a text interaction-history 521 consisting of two n-grams: "men's" 522 and "bike" 524.

In FIG. 5A, at step 520, social-networking system may map the demographic information to two vector representations (i.e., one for each component), using, for example, dictionary 300C, which is generated using a machine-learning-generated model. Each demographic component 502 and 504 may be mapped to a respective vector representation 532 and 534, as described above in connection with FIG. 3C. In particular embodiments, certain demographic components (e.g., any components not significantly relevant to the demographic information) may be disregarded. At step 525, social-networking system may map the image interaction history to two vector representations (i.e., one for each image feature), using, for example, dictionary 300B, which is generated using the machine-learning-generated model. Each image feature 512 and 514 may be mapped to a respective vector representation 542 and 544, as described above in connection with FIG. 3B. At step 529, social-networking system may map the text component to two vector representations (i.e., one for each n-gram), using, for example, dictionary 300A, which is generated using the machine-learning-generated model. Each n-gram 522 and 524 may be mapped to a respective vector representation 552 and 554, as described above in connection with FIG. 3A. In particular embodiments, certain n-grams of a text component (e.g., pronouns, prepositions, conjunctions, or any other words not significantly contributing to the meaning of the text query) may be disregarded.

At step 530, vector representations 532 and 534 may be combined. Any suitable technique may be used to combine vector representations 532 and 534 into a single vector representation 562, including, as an example and not by way of limitation, convolution, averaging, any other suitable non-linear combination technique, any other suitable technique, or any combination thereof. In the illustrated example of FIGS. 5A-5B, social-networking system performs a convolution of the two vectors 532 and 534 and then a max pooling operation to yield one vector representation 562 of the demographic information 501. Similarly, at step 535, vector representations 542 and 544 may be combined into a single vector representation 564 of the image interaction history 511. At step 539, vector representations 552 and 554 may be combined into a single vector representation 566 of the text interaction history 521.

Moving to FIG. 5B, at step 540, vector representations 562, 564, and 566 may be combined. Any suitable technique may be used to combine vector representations 562, 564, and 566 into a single vector representation 568, including those described above. In the illustrated example of FIGS. 5A-5B, social-networking system performs a convolution of the three vectors 562, 564, and 566 to yield one vector representation 568 of the content interaction history.

At step 550, a content-interaction embedding may be determined based on the vector representation 568 of the content interaction history. In particular embodiments, social-networking system may determine a content-interaction embedding based on the vector representation 568. As used herein, a content-interaction embedding may refer to a representation of the content interaction history of a particular user in an embedding space based on the combined vector representation 568 of the demographic information, image interaction history, and text interaction history. Coordinates for a point in an embedding space may be determined based on vector representation 568 of the content interaction history. In particular embodiments, the machine-learning-generated model may be used to generate a plurality of content-interaction embeddings for a plurality of users, respectively. Each of these content-interaction embeddings may be based on a respective vector representation that corresponds to a particular point in an embedding space. An example embedding space is depicted in and described in connection with FIG. 6.

Although this disclosure describes and illustrates particular embodiments of FIGS. 5A-5B as being implemented by social-networking system, this disclosure contemplates any suitable embodiments of FIGS. 5A-5B occurring on any suitable interface and as being implemented by any suitable platform or system. As an example, and not by way of limitation, particular embodiments of FIGS. 5A-5B may be implemented by client system 130 or third-party system 170. Furthermore, although this disclosure describes and illustrates particular components, devices, or systems carrying out particular steps of the method of FIGS. 5A-5B, this disclosure contemplates any suitable combination of any suitable components, devices, or systems carrying out any suitable steps of the method of FIGS. 5A-5B. Although this disclosure describes and illustrates particular steps of the method of FIGS. 5A-5B as occurring in parallel or in a particular order, this disclosure contemplates the particular steps of FIGS. 5A-5B occurring in any suitable order with or without steps occurring in parallel.

In particular embodiments, the plurality of product-listing embeddings and the content-interaction embedding may be generated by respective machine-learning-generated models of the social-networking system. As an example, and not by way of limitation, A module for training a machine-learning-generated model may employ one or more machine learning techniques including deep learning, neural networks, any other suitable machine learning technique, or any combination thereof. In particular embodiments, the machine-learning-generated model used for the product-listing embedding and the machine-learning-generated model for the content-interaction embedding may be generated independently. The machine-learning-generated models may be trained to minimize or reduce error between the product-listing embeddings of products relevant to the first user and the content-interaction embedding associated with the first user. In other words, a goal of the training of the machine-learning models may be to generate product-listing embeddings that correspond to points in an embedding space that are proximate to points corresponding to content-interaction embeddings of interested users. In particular embodiments, the machine-learning-generated models for the content-interaction and product-listing embeddings may be generated by two parallel and co-trained machine-learning-generated models. The machine-learning-generated models may be parallel in that they are trained and operate at the same time over similar or associated datasets. The machine-learning-generated models may be co-trained in that they are trained to optimize similar or joint value functions. This may allow the machine-learning-generated models to "learn" that product-listing embeddings and content-interaction embeddings comprising similar image representations or text item representations should be located near each other in the embedding spaces.

In particular embodiments, the machine-learning-generated models may be trained using a rank-loss methodology. In a rank-loss methodology the training data set provides a relative ranking of two items rather than merely a positive or negative match for each item. As an example and not by way of limitation, the training data set for the machine learning modules may comprise a plurality of rankings of three product listings for products A, B, and C, and the preferences of two users with respect to those three product listings. In particular embodiments, the preferences may be explicitly stated by the users (i.e., the users may have expressly ranked the items). In particular embodiments, the preferences may be derived from user behavior. As an example the first user may have ranked the products and indicated a preference for product A over products B and C, and product B over product C. The machine-learning-generated model for content-interaction embeddings may generate a content-interaction embedding for the first user such that product A has highest priority, product C has lowest priority, and product B is in-between. As another example and not by way of limitation, the second user may have interacted with each of the products. The second user may have chosen to interact with product B instead of product A, and with product C instead of product B. These interactions may be used by the social-networking system to train the machine-learning-generated model for content-interaction embeddings to reflect a preference for product B over product A and product C over product B. Furthermore, even though there was no choice presented to the user between product A and product C, the machine-learning-generated model may infer that the second user will prefer product C over product A. The machine-learning-generate model may generate a content-interaction embedding for the second user accordingly. It will be recognized that, while these examples deal with a small number of items, a small number of comparisons, and a small number of comparisons per item, the rank-loss methodology can be appropriately expanded to cover any suitable number of items and comparisons. Although this disclosure describes training machine-learning-generated models in a particular manner, this disclosure contemplates training machine-learning-generated models in any suitable manner.

Because the personalized retrieval model must be quick, in particular embodiments, part of the necessary processing may be performed offline. As an example, because generating product-listing and content-interaction embeddings may be computationally expensive or time consuming, generating the embeddings may be performed in batch operations during off-peak usage hours. In particular embodiments, the social-networking system may generate the product-listing embedding for a particular product listing when the particular product listing is submitted to the marketplace or when the particular product listing is updated. In particular embodiments, the social-networking system may generate the content-interaction embedding associated with the first user regularly or on a periodic basis. As an example, and not by way of limitation, the social-networking system may generate content-interaction embeddings for every user of the online social network every 24 hours. In particular embodiments, the social-networking system may generate content-interaction embeddings for those users that have made one or more changes to the information included in a content-interaction embedding since the last periodic generation time. In particular embodiments, the social-networking system may more frequently generate content-interaction embeddings for users that frequently modify the information used in a content-interaction embedding than for users that do not. Although this disclosure describes the offline generation of embeddings in a particular manner, this disclosure contemplates the offline generation of embeddings in any suitable manner.

Figure 6:
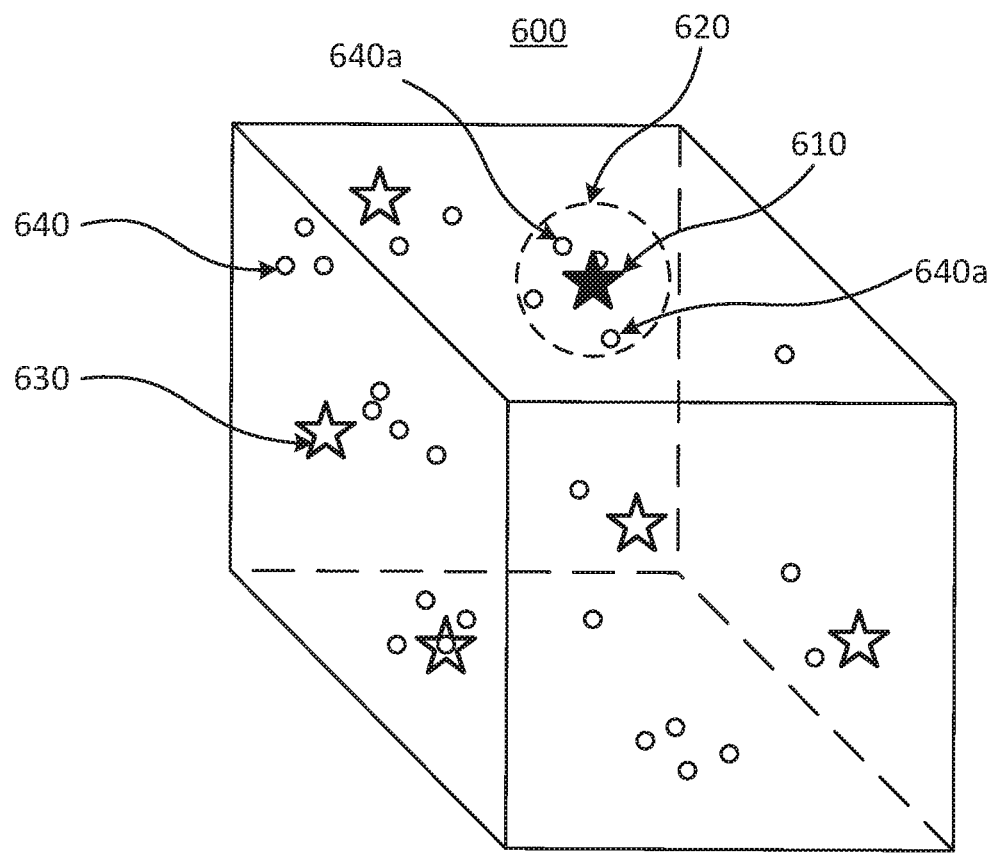
FIG. 6 illustrates an example view of an embedding space.

FIG. 6 illustrates an example view of an embedding space 600. Embedding space 600 includes a point corresponding to a content-interaction embedding 610 and a plurality of points corresponding to a plurality of product-listing embeddings 640. Embedding space 600 may additionally include a plurality of points corresponding to a plurality of content-interaction embeddings 630. A plurality of product-listing embeddings may be determined based on the vector representations of product-listings determined using the machine-learning-generated model, and the product-listing embeddings may be represented in embedding space 600 as points 640. Similarly, a plurality of content-interaction embeddings may be determined based on the vector representations of content interaction histories determined using the machine-learning-generated model, and the content-interaction embeddings may be represented in embedding space 600 as points 630. The point corresponding to the content-interaction embedding 610 may be, as an example and not by way of limitation, the content-interaction embedding determined in step 540 of FIG. 5B. Although embedding space 600 is illustrated as being a three-dimensional space, it will be understood that this is for illustrative purposes only, and embedding space 600 may be of any suitable dimension. As an example and not by way of limitation, embedding space 600 may be d-dimensional, and the vector representations on which the embeddings are based (e.g., product-listing embeddings and content-interaction embeddings) may be d-dimensional intensity vectors, where d denotes any suitable number of dimensions.

In particular embodiments, the social-networking system may filter the set of product listings by searching the product-listing embeddings for product-listings that are similar to the content interaction history of the first user. Various techniques may be used to compare the similarity of the embeddings. In particular embodiments, the social-networking system may search the embedding space of the product-listing embeddings for product-listing embeddings that are within a threshold distance of the content-interaction embedding of the first user, or the projection of the content-interaction embedding of first user onto the product-listing embedding space. In the illustrated example of FIG. 6, the threshold distance is depicted as an area 620 in embedding space 600. As an example and not by way of limitation, point 610 may be a point corresponding to the content-interaction embedding of the first user and the points identified as being within area 620 of point 610 may include points 640a corresponding to product-listing embeddings for products relevant to the first user. In particular embodiments, social-networking system may use any suitable technique for computing a distance including an inner product (or "dot product") of the vector representations of the embeddings, locality-sensitive hashing, hierarchical clustering techniques, ball tree techniques, binary search tree techniques, a space-partitioning data structure for organizing points in a k-dimensional space (e.g., a k-dimensional tree), quantization, any other suitable search algorithm or technique, or any combination thereof. Although this disclosure describes and illustrates particular embodiments of FIG. 6 as being implemented by social-networking system, this disclosure contemplates any suitable embodiments of FIG. 6 occurring on any suitable interface and as being implemented by any suitable platform or system. As an example, and not by way of limitation, particular embodiments of FIG. 6 may be implemented by client system 130 or third-party system 170. More about embedding spaces and training models to map an object to vector representations and embedding spaces can be found in U.S. patent application Ser. No. 14/949,436, filed 23 Nov. 2015, which is incorporated by reference herein. Although this disclosure describes and illustrates embedding spaces in a particular manner, this disclosure contemplates any suitable manner of configured embedding spaces.

In particular embodiments, the social-networking system may perform the search for product-listing embeddings within a threshold distance of the content-interaction embedding by: for each of the product listings, computing an inner product of the content-interaction embedding and the respective product-listing embedding to generate a filter value; and removing from the set of product listings one or more product listings having a filter value that does not satisfy a threshold filter value. When the first user requests to access the marketplace, the social-networking system may compute the inner product of the content-interaction embedding of the first user and each product-listing embedding corresponding to a product listing in the set of product listings retrieved by the social-networking system responsive to the first user's request to access the marketplace. Because the inner product is a relatively fast computation, this may be calculated online without significantly impacting the speed of the retrieval of product listings. As an example, and not by way of limitation, the social-networking system may determine a threshold filter value. Because the result of the inner product of two vectors is a scalar value, the social-networking system may use this scalar value as a filter value. The threshold filter value may be used to ensure that items satisfying a specified level of relevance are presented to the first user. This may improve the relevance of the product listings provided to the first user. In particular embodiments, the threshold filter value may be predetermined by the social-networking and may apply to all, or a subset, of the users of the online social network. In particular embodiments, the threshold filter value may be determined based on an analysis of the filter values calculated for the product listings in the user's product inventory. This may be useful when a level of relevance cannot be guaranteed for a user. The threshold filter value may be derived from a statistical analysis of the calculated filter values. As another example, and not by way of limitation, the threshold value may reflect a ranking of the products. The product listings may be ranked according to their filter values, and the filter value may be a threshold rank. Such a threshold may ensure a maximum number of items to send to the ranking stage. The product listings satisfying the threshold filter value may be sent to the ranking stage. Although this disclosure describes filtering the set of product listings in a particular manner, this disclosure contemplates filtering the set of product listings in any suitable manner.

In particular embodiments, the social-networking system may rank each product listing in the filtered set based at least on a product-score representing a likelihood of the first user interacting with the respective product, the product-score being based on interaction information associated with the first user, product information associated with the product, and sparse information associated with the first user. In particular embodiments, the filtered set of objects may be passed to and received by a module of the social-networking system for ranking by a ranking model. The ranking model may generate a product-score. The ranking model may base the calculation of the product-score on a set of ranking signals. The ranking signals may overlap with the information used in the filtering step (i.e., the content interaction history and product-listing information). The product-score may represent a calculated probability of the user interacting with the product-listing. In particular embodiments, the product listings may be ranked directly on the calculated probability of interaction. In particular embodiments, the product-score may comprise a weighted combination of a plurality of calculated probabilities, each of the calculated probabilities representing a likelihood of the first user initiating a particular interaction with the respective product listing. As an example and not by way of limitation, the social-networking system may calculate a variety of probabilities including, but not limited to: a probability of the user accessing a product-listing after viewing the marketplace (i.e., a "click-through" probability), a probability of the user liking a product-listing, a probability of a user commenting on a product-listing, a probability of a user contacting an owner or poster of a product listing, a probability of the user sharing a product listing, a probability of a user dismissing or hiding a product-listing, a probability of a user successfully purchasing the product of the product listing, a probability of any other suitable interaction, or any combination thereof. The calculated probability may comprise a weighted combination of the probabilities calculated for the user regarding the specific product listing. For example, the weighted combination may be of the form:

$$\text{product\_score}(\text{prod}_i) = \Sigma \text{weight}(\text{event}_k) * P(\text{event}_k | \text{prod}_i)$$

where $\text{prod}_i$ refers to a particular product listing, $\text{product\_score}(\text{prod}_i)$ is a product-score for product listing $\text{prod}_i$, $\text{event}_k$ is a particular interaction event, $\text{weight}(\text{event}_k)$ is a weighting factor determined for $\text{event}_k$, and $P(\text{event}_k|\text{prod}_i)$ is the calculated probability of user interaction event $\text{event}_k$ occurring given product listing $\text{prod}_i$. In particular embodiments, the ranking may be performed by a machine-learning-generated model. The machine-learning-generated model may comprise a plurality of other machine-learning-generated models. The plurality of machine-learning-generated models may be of the same type, different types, trained using the same or different techniques, trained on the same or different data, or any suitable combination or variation. Although this disclosure describes ranking product listings in a particular manner, this disclosure contemplates ranking product listings in any suitable manner.

In particular embodiments, the product-score may be based on product information associated with the product or product listing. In particular embodiments, the product information associated with each product listing may comprise, content associated with the product listing, a product category, an interaction history associated with the product or product category, any other suitable information, or any combination thereof. The content associated with the product listing may overlap with the content associated with the product listing used in generating the product-listing embedding. The product information may include other content not used in generating the product-listing embedding. Although this disclosure describes product information in a particular manner, this disclosure contemplates any suitable product information.

In particular embodiments, the product information may include a category associated with the product. In particular embodiments, the category may be selected by the user from a list of user-provided categories. As an example, a user may establish a personalized subsection of the marketplace. The user may determine applicable categories for the subsection such as "Home Goods" and "Children's Clothing". When creating a product listing, the user may select that a new product listing for a couch should be associated with the "Home Goods" category. In particular embodiments, the category may be selected by the social-networking system from the list of user-provided categories. The social-networking system may be trained to determine applicable categories for a product listing from an enumerated list of categories. The social-networking system may also determine the applicable categories based on other similar categories in other enumerated lists. Continuing from the previous example, the social-networking system may suggest or automatically associate a product listing for a lounge chair with the "Home Goods" category. The user may or may not confirm the category. In particular embodiments, the category may be selected by the user from a list of categories pre-set by the social networking system. The social-networking system may provide an enumerated list of acceptable categories, and a user may select one or more categories with which to associate a new product listing. In particular embodiments, the social-networking system may determine one or more categories to associate with the product listing from an enumerated list of categories. The social networking system may assign the categories based on an analysis of the content of the product listing, a user history of product-listing creation, popularity, determined user preference, any other suitable information, or any combination thereof. Although this disclosure describes determining and assigning categories in a particular manner, this disclosure contemplates determining and assigning categories in any suitable manner.

In particular embodiments, the product information may include an interaction history associated with the product or product category. The interaction history may include a record of the interactions the user or one or more other users have had with the product listing. The product-score may reflect a comparison of the other users to the user to determine the relevance of the other user's interactions to the likelihood of the user interaction with the product-listing. As an example, and not by way of limitation, a first user may have interacted recently with a product listing for a purse made by a particular designer. The social-networking system may determine that, because a comparison of the profile and behavior of the first user and second user indicates that the users have similar interests (by, for example, both interacting with the same product listings), the second user may be interested in the product listing. This comparison may be based, for example, at least in part on social affinity, social graph distance, any other suitable measure, or any combination thereof. Although this disclosure describes an interaction history in a particular manner, this disclosure contemplates any suitable manner of interaction history.

In particular embodiments, the product-score may be based on interaction information associated with the first user. In general, the interaction information may be a record of the user's interactions with products in the marketplace or other interactions with the users, entities, and objects of the online social network. The interaction information may provide additional insight into the user's preferences for product-listings, or for particular properties of or content within a product-listing. As an example and not by way of limitation the interaction information may include information such as a user's profile information which may indicate a user likes particular brands, artists, or types of products. The interaction information may include information from the marketplace, such as a user's "success rate" of contacting a seller and completing a transaction, or the categories of products with which the user typically interacts. The interaction information may include any suitable information relevant to a user's probability of interacting with a product listing, and the examples described herein are not intended to be read as limiting examples. Although this disclosure describes user interaction information in a particular manner, this disclosure contemplates any suitable manner of user interaction information.

In particular embodiments, the interaction information associated with the first user may comprise: a content interaction history associated with the first user; a user-category interaction history associated with the first user; a user-group interaction history associated with the first user; a user-content interaction history associated with the first user; a similar-product interaction history associated with the first user; any other suitable information, or any combination thereof. In particular embodiments, the content interaction history may include information about the content items associated with particular product listings with which the user has interacted in the past. The content interaction history may overlap with that used above while generating content-interaction embeddings, and may include a deeper or broader collection of the information. As an example, and not by way of limitation, the content interaction history may include the n-grams and image features associated with product-listings with which the user has interacted, as well as the interactions for specific product listings. For a particular user, the content interaction history may include that the particular user has clicked on multiple product listings with the n-grams "men's" and "bicycle", and has contacted the seller of product listings containing the n-grams "men's", "road", "bicycle".

In particular embodiments, the user-category interaction history may include information about particular product categories with which the user has interacted in the past. This may include the frequency of interaction with particular categories, timing or depth of interaction with particular categories, whether a user specifically searches for goods within particular categories (i.e., by selecting to filter by that specific category), a successful-purchase rate associated with a category, any other suitable information, or any combination thereof. As an example, and not by way of limitation, for a particular user, the user-category interaction history may include that the user has interacted with multiple items from a "Home Goods" category in the past. The user-category interaction may indicate that the user has specifically filtered for items within the "Home Goods" category while browsing the marketplace. The social-networking system may use this information to display more items in the "Home Goods" category to the particular user on subsequent visits to the marketplace.

In particular embodiments, the user-group interaction history may include information about a user's group membership or the status of groups of which the user is a member. The user-group history may include information about the user's interactions with members of specific groups as it relates to determining a user's likelihood of interaction with a particular product or product category. As an example, and not by way of limitation, if a user is a member of a group called "Shiba Inu Owner's Club" the social-networking system may increase the product-score for items in "Pet Care" or "Dog Care" categories. The social-networking system may also increase the product-score for item with n-grams corresponding to the name of the group based on a determination that because the user is a member of the group, the user is a fan of the dog breed Shiba Inu.

In particular embodiments, the user-content interaction history may include information about a user's interaction with other content available through the social-networking system besides the content within product listings. The interactions may include interactions with images or posts created by other users of the online social network. In particular embodiments, the user-content interaction history may include an analysis of the interactions, such as by a sentiment analysis of the content. As an example, and not by way of limitation, if a user has recently liked a post by a friend of the user including a picture of a car with the caption: "Check out these new shoes!", or has commented on the post saying "I'm so jealous, I need a pair!" the social-networking system may increase the score of product listings including similar shoes or brands of shoes. As another example, and not by way of limitation. If a user has recently "liked" a profile page associated with a band, the social-networking system may increase the product-score for product listings related to that band, such as for the band's records or posters.

In particular embodiments, the similar-product interaction history may include information about the products with which a user has interacted in the past. The various products, or the products satisfying a threshold level of interaction, in the similar-product interaction history may be compared to the products in the set of product listings. The social-networking system may increase the ranking-score of product listings similar to those product listings. The social-networking system may consider the level of interaction when increasing the ranking-score. As an example, and not by way of limitation, if a user has messaged the owners of product listings for a variety of bicycles, but the owner has not indicated that the item was sold, the social-networking system may determine that the user is searching for a new bicycle and increase the ranking of bicycles with similar features or price range. If the user later contacts the owner of a product-listing for a bicycle, and the owner indicates a successful sale, the social-networking system may determine that the user will no longer be interested in purchasing a bicycle and decrease the ranking-score of bicycles.

In particular embodiments, the product-score may be based on sparse information associated with the first user. As used herein, sparse information may comprise user engagement or association information wherein a number of possible engagement recipients is substantially larger than a number of engagement recipients or associates with whom the first user has engaged. Sparse information may comprise a user's indication that they are interested in or endorse a page, product, or concept. The interactions may include, for example, a like, comment, share, click, view, hide, or any other suitable information. The records may include a frequency, timing, age, context, or other suitable information regarding the interaction, or any combination thereof. The information may reflect a record of the interactions in an environment in which the number of possible recipients of interactions is significantly larger than the number of actual users, entities, or objects, with which the user has interacted. In this way, the information is sparse, because the population of actual engagements is sparse relative to the population of possible engagements. In particular embodiments, the sparse information may be determined in part by reference to a social graph, as described in greater detail below. The social graph may include a description of relationships between users, concepts, and entities on the online social network, and may be used to determine the nature of the relationships. As an example and not by way of limitation, the sparse information may include the collection of concepts and entities the user has "liked", as indicated by the user's profile. This information may be considered sparse information because the number of concepts and entities that a user can like on the online social network can be very large. The collection of concepts and entities the user has liked may indicate a higher likelihood of a user interacting with product listings related to those concepts or entities because of this difference between possible likes and actual likes. Although this disclosure describes sparse information in a particular manner, this disclosure contemplates any suitable manner of sparse information.

In particular embodiments, the social-networking system may send, to the client system of the first user, a subset of the ranked product listings having a rank that satisfies a threshold. The threshold may be a "high" threshold value or "low" threshold value depending on the specifics of the implementation. As an example, and not by way of limitation, the threshold may be a rank number threshold in which the best match is rank 1 and the worst match is the rank with the highest numerical value. The threshold may be rank 50, so that the product listings having ranks 1 to 50 may be sent to the client system of the first user. The threshold may be determined by the social-networking system based on the capabilities of the client system of the first user. For example, if the client system of the first user is determined to be a desktop computing device connected to a home wireless network, the threshold may allow for more product listings to be sent to the client system than if the client system is determined to be a mobile device connected to a cellular data connection. Sending the subset of the ranked product listings may comprise sending references to the product listings available through the marketplace. Sending the subset may comprise sending instructions for generating the marketplace page including the subset of the product-listings or references to the subset. Although this disclosure describes sending product listings to a client system in a particular manner, this disclosure contemplates sending product listings to a client system in any suitable manner.

Figure 7:
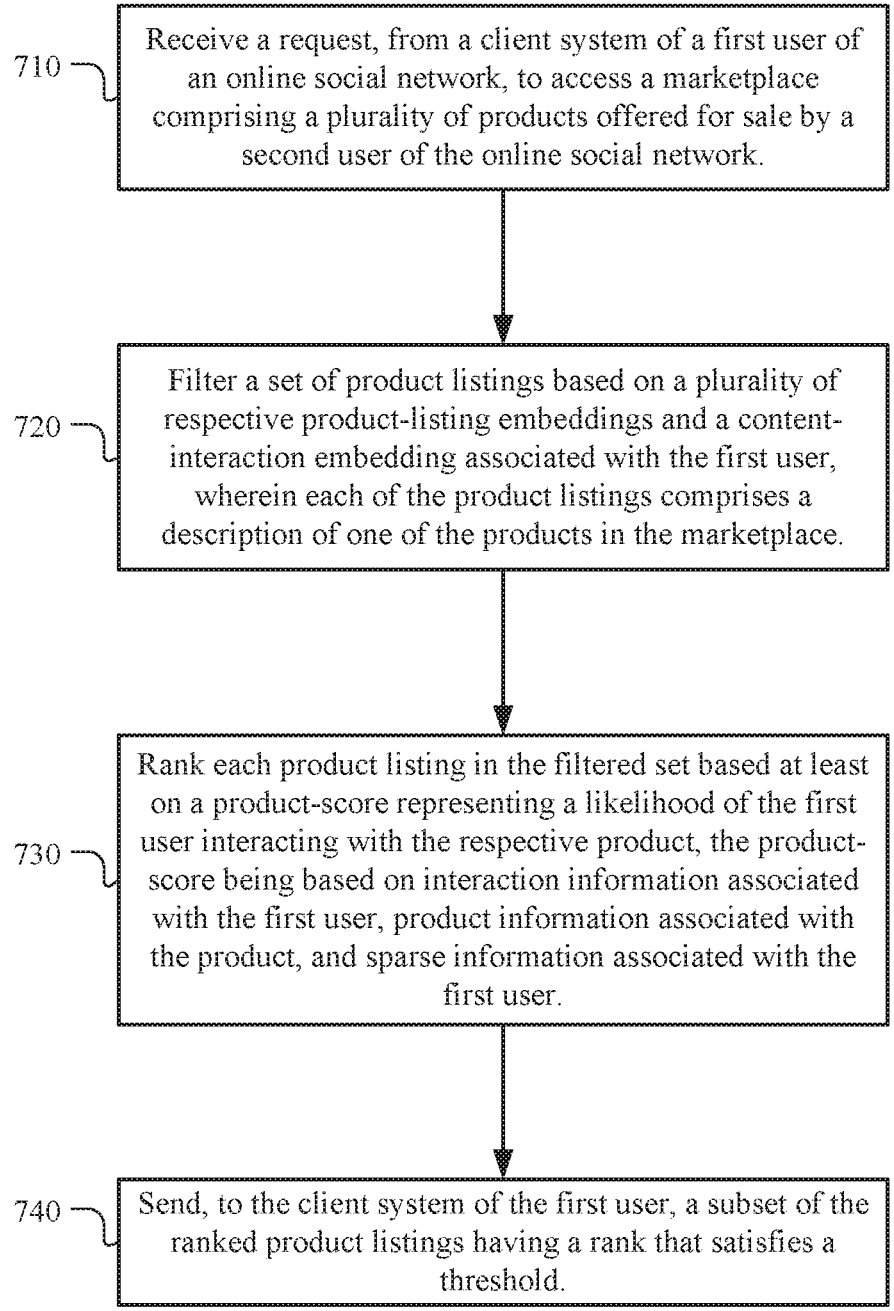
FIG. 7 illustrates an example method for displaying product listings in a marketplace.

FIG. 7 illustrates an example method 700 for displaying product listings in a marketplace. The method may begin at step 710, where the social-networking system may receive a request, from a client system of a first user of an online social network, to access a marketplace comprising a plurality of products offered for sale by a second user of the online social network. At step 720, the social-networking system may filter a set of product listings based on a plurality of respective product-listing embeddings and a content-interaction embedding associated with the first user, wherein each of the product listings comprises a description of one of the products in the marketplace. At step 730, the social-networking system may rank each product listing in the filtered set based at least on a product-score representing a likelihood of the first user interacting with the respective product, the product-score being based on interaction information associated with the first user, product information associated with the product, and sparse information associated with the first user. At step 740, the social-networking system may send, to the client system of the first user, a subset of the ranked product listings having a rank that satisfies a threshold. Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for displaying product listings in a marketplace including the particular steps of the method of FIG. 7, this disclosure contemplates any suitable method for displaying product listings in a marketplace including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Figure 8:
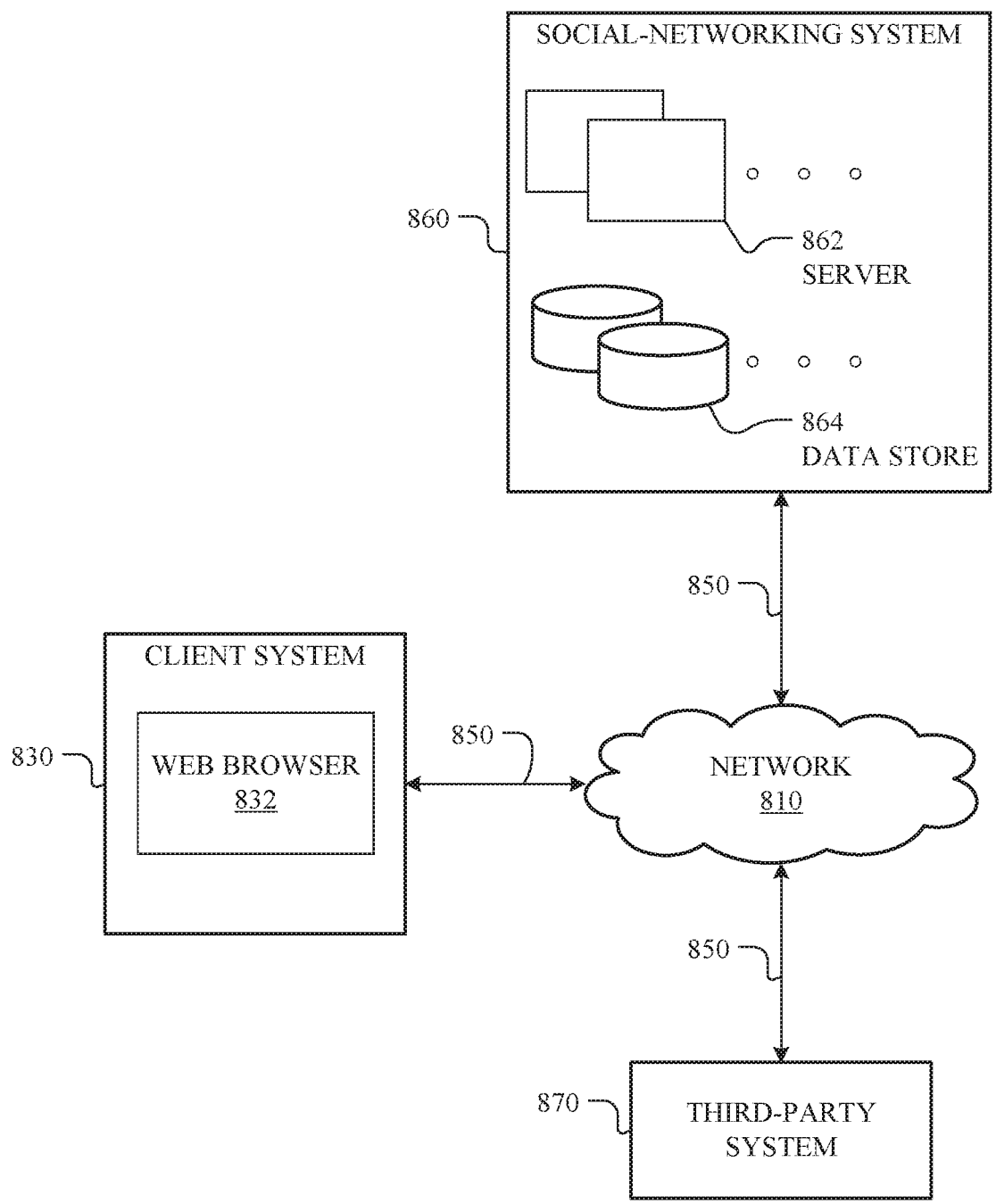
FIG. 8 illustrates an example network environment associated with a social-networking system.

FIG. 8 illustrates an example network environment 800 associated with a social-networking system. Network environment 800 includes a client system 830, a social-networking system 860, and a third-party system 870 connected to each other by a network 810. Although FIG. 8 illustrates a particular arrangement of client system 830, social-networking system 860, third-party system 870, and network 810, this disclosure contemplates any suitable arrangement of client system 830, social-networking system 860, third-party system 870, and network 810. As an example and not by way of limitation, two or more of client system 830, social-networking system 860, and third-party system 870 may be connected to each other directly, bypassing network 810. As another example, two or more of client system 830, social-networking system 860, and third-party system 870 may be physically or logically co-located with each other in whole or in part. Moreover, although FIG. 8 illustrates a particular number of client systems 830, social-networking systems 860, third-party systems 870, and networks 810, this disclosure contemplates any suitable number of client systems 830, social-networking systems 860, third-party systems 870, and networks 810. As an example and not by way of limitation, network environment 800 may include multiple client system 830, social-networking systems 860, third-party systems 870, and networks 810.

This disclosure contemplates any suitable network 810. As an example and not by way of limitation, one or more portions of network 810 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 810 may include one or more networks 810.

Links 850 may connect client system 830, social-networking system 860, and third-party system 870 to communication network 810 or to each other. This disclosure contemplates any suitable links 850. In particular embodiments, one or more links 850 include one or more wireline (such as for example Digital Subscriber Line (DSL) or Data Over Cable Service Interface Specification (DOC SIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 850 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 850, or a combination of two or more such links 850. Links 850 need not necessarily be the same throughout network environment 800. One or more first links 850 may differ in one or more respects from one or more second links 850.

In particular embodiments, client system 830 may be an electronic device including hardware, software, or embedded logic components or a combination of two or more such components and capable of carrying out the appropriate functionalities implemented or supported by client system 830. As an example and not by way of limitation, a client system 830 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 830. A client system 830 may enable a network user at client system 830 to access network 810. A client system 830 may enable its user to communicate with other users at other client systems 830.

In particular embodiments, client system 830 may include a web browser 832, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 830 may enter a Uniform Resource Locator (URL) or other address directing the web browser 832 to a particular server (such as server 862, or a server associated with a third-party system 870), and the web browser 832 may generate a Hyper Text Transfer Protocol (HTTP) request and communicate the HTTP request to server. The server may accept the HTTP request and communicate to client system 830 one or more Hyper Text Markup Language (HTML) files responsive to the HTTP request. Client system 830 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 860 may be a network-addressable computing system that can host an online social network. Social-networking system 860 may generate, store, receive, and send social-networking data, such as, for example, user-profile data, concept-profile data, social-graph information, or other suitable data related to the online social network. Social-networking system 860 may be accessed by the other components of network environment 800 either directly or via network 810. As an example and not by way of limitation, client system 830 may access social-networking system 860 using a web browser 832, or a native application associated with social-networking system 860 (e.g., a mobile social-networking application, a messaging application, another suitable application, or any combination thereof) either directly or via network 810. In particular embodiments, social-networking system 860 may include one or more servers 862. Each server 862 may be a unitary server or a distributed server spanning multiple computers or multiple datacenters. Servers 862 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 862 may include hardware, software, or embedded logic components or a combination of two or more such components for carrying out the appropriate functionalities implemented or supported by server 862. In particular embodiments, social-networking system 860 may include one or more data stores 864. Data stores 864 may be used to store various types of information. In particular embodiments, the information stored in data stores 864 may be organized according to specific data structures. In particular embodiments, each data store 864 may be a relational, columnar, correlation, or other suitable database. Although this disclosure describes or illustrates particular types of databases, this disclosure contemplates any suitable types of databases. Particular embodiments may provide interfaces that enable a client system 830, a social-networking system 860, or a third-party system 870 to manage, retrieve, modify, add, or delete, the information stored in data store 864.

In particular embodiments, social-networking system 860 may store one or more social graphs in one or more data stores 864. In particular embodiments, a social graph may include multiple nodes—which may include multiple user nodes (each corresponding to a particular user) or multiple concept nodes (each corresponding to a particular concept)—and multiple edges connecting the nodes. Social-networking system 860 may provide users of the online social network the ability to communicate and interact with other users. In particular embodiments, users may join the online social network via social-networking system 860 and then add connections (e.g., relationships) to a number of other users of social-networking system 860 to whom they want to be connected. Herein, the term "friend" may refer to any other user of social-networking system 860 with whom a user has formed a connection, association, or relationship via social-networking system 860.

In particular embodiments, social-networking system 860 may provide users with the ability to take actions on various types of items or objects, supported by social-networking system 860. As an example and not by way of limitation, the items and objects may include groups or social networks to which users of social-networking system 860 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 860 or by an external system of third-party system 870, which is separate from social-networking system 860 and coupled to social-networking system 860 via a network 810.

In particular embodiments, social-networking system 860 may be capable of linking a variety of entities. As an example and not by way of limitation, social-networking system 860 may enable users to interact with each other as well as receive content from third-party systems 870 or other entities, or to allow users to interact with these entities through an application programming interfaces (API) or other communication channels.

In particular embodiments, a third-party system 870 may include one or more types of servers, one or more data stores, one or more interfaces, including but not limited to APIs, one or more web services, one or more content sources, one or more networks, or any other suitable components, e.g., that servers may communicate with. A third-party system 870 may be operated by a different entity from an entity operating social-networking system 860. In particular embodiments, however, social-networking system 860 and third-party systems 870 may operate in conjunction with each other to provide social-networking services to users of social-networking system 860 or third-party systems 870. In this sense, social-networking system 860 may provide a platform, or backbone, which other systems, such as third-party systems 870, may use to provide social-networking services and functionality to users across the Internet.

In particular embodiments, a third-party system 870 may include a third-party content object provider. A third-party content object provider may include one or more sources of content objects, which may be communicated to a client system 830. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 860 also includes user-generated content objects, which may enhance a user's interactions with social-networking system 860. User-generated content may include anything a user can add, upload, send, or "post" to social-networking system 860. As an example and not by way of limitation, a user communicates posts to social-networking system 860 from a client system 830. Posts may include data such as status updates or other textual data, location information, photos, videos, links, music or other similar data or media. Content may also be added to social-networking system 860 by a third-party through a "communication channel," such as a newsfeed or stream.

In particular embodiments, social-networking system 860 may include a variety of servers, sub-systems, programs, modules, logs, and data stores. In particular embodiments, social-networking system 860 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 860 may also include suitable components such as network interfaces, security mechanisms, load balancers, failover servers, management-and-network-operations consoles, other suitable components, or any suitable combination thereof. In particular embodiments, social-networking system 860 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 860 to one or more client systems 830 or one or more third-party system 870 via network 810. The web server may include a mail server or other messaging functionality for receiving and routing messages between social-networking system 860 and one or more client systems 830. An API-request server may allow a third-party system 870 to access information from social-networking system 860 by calling one or more APIs. An action logger may be used to receive communications from a web server about a user's actions on or off social-networking system 860. In conjunction with the action log, a third-party-content-object log may be maintained of user exposures to third-party-content objects. A notification controller may provide information regarding content objects to a client system 830. Information may be pushed to a client system 830 as notifications, or information may be pulled from client system 830 responsive to a request received from client system 830. Authorization servers may be used to enforce one or more privacy settings of the users of social-networking system 860. A privacy setting of a user determines how particular information associated with a user can be shared. The authorization server may allow users to opt in to or opt out of having their actions logged by social-networking system 860 or shared with other systems (e.g., third-party system 870), such as, for example, by setting appropriate privacy settings. Third-party-content-object stores may be used to store content objects received from third parties, such as a third-party system 870. Location stores may be used for storing location information received from client systems 830 associated with users. Advertisement-pricing modules may combine social information, the current time, location information, or other suitable information to provide relevant advertisements, in the form of notifications, to a user.

Figure 9:
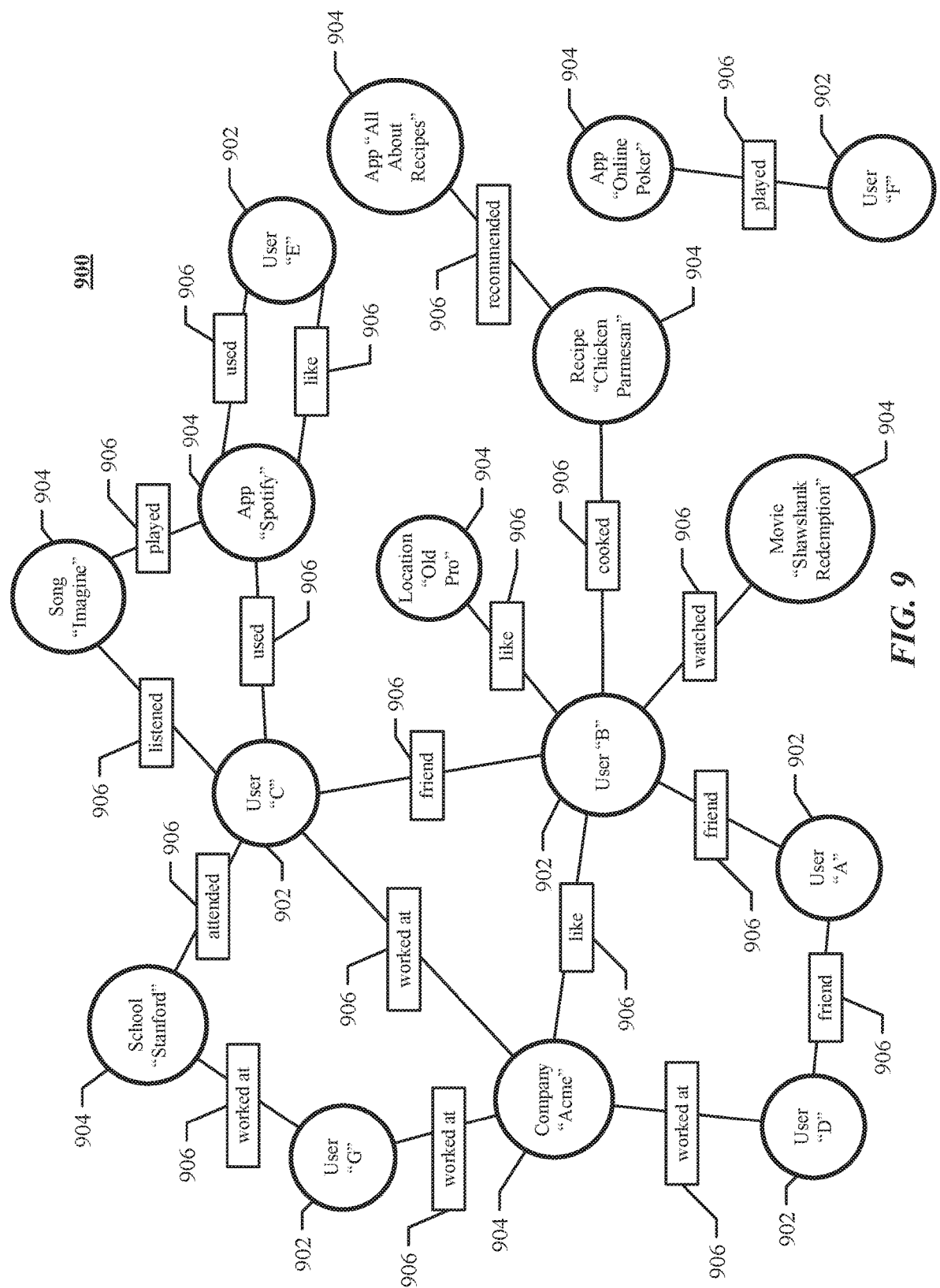
FIG. 9 illustrates an example social graph.

FIG. 9 illustrates example social graph 900. In particular embodiments, social-networking system 860 may store one or more social graphs 900 in one or more data stores. In particular embodiments, social graph 900 may include multiple nodes—which may include multiple user nodes 902 or multiple concept nodes 904—and multiple edges 906 connecting the nodes. Example social graph 900 illustrated in FIG. 9 is shown, for didactic purposes, in a two-dimensional visual map representation. In particular embodiments, a social-networking system 860, client system 830, or third-party system 870 may access social graph 900 and related social-graph information for suitable applications. The nodes and edges of social graph 900 may be stored as data objects, for example, in a data store (such as a social-graph database). Such a data store may include one or more searchable or queryable indexes of nodes or edges of social graph 900.

In particular embodiments, a user node 902 may correspond to a user of social-networking system 860. As an example and not by way of limitation, a user may be an individual (human user), an entity (e.g., an enterprise, business, or third-party application), or a group (e.g., of individuals or entities) that interacts or communicates with or over social-networking system 860. In particular embodiments, when a user registers for an account with social-networking system 860, social-networking system 860 may create a user node 902 corresponding to the user, and store the user node 902 in one or more data stores. Users and user nodes 902 described herein may, where appropriate, refer to registered users and user nodes 902 associated with registered users. In addition or as an alternative, users and user nodes 902 described herein may, where appropriate, refer to users that have not registered with social-networking system 860. In particular embodiments, a user node 902 may be associated with information provided by a user or information gathered by various systems, including social-networking system 860. As an example and not by way of limitation, a user may provide his or her name, profile picture, contact information, birth date, sex, marital status, family status, employment, education background, preferences, interests, or other demographic information. In particular embodiments, a user node 902 may be associated with one or more data objects corresponding to information associated with a user. In particular embodiments, a user node 902 may correspond to one or more webpages.

In particular embodiments, a concept node 904 may correspond to a concept. As an example and not by way of limitation, a concept may correspond to a place (such as, for example, a movie theater, restaurant, landmark, or city); a website (such as, for example, a website associated with social-network system 860 or a third-party website associated with a web-application server); an entity (such as, for example, a person, business, group, sports team, or celebrity); a resource (such as, for example, an audio file, video file, digital photo, text file, structured document, or application) which may be located within social-networking system 860 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 904 may be associated with information of a concept provided by a user or information gathered by various systems, including social-networking system 860. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 904 may be associated with one or more data objects corresponding to information associated with concept node 904. In particular embodiments, a concept node 904 may correspond to one or more webpages.

In particular embodiments, a node in social graph 900 may represent or be represented by a webpage (which may be referred to as a "profile page"). Profile pages may be hosted by or accessible to social-networking system 860. Profile pages may also be hosted on third-party websites associated with a third-party system 870. As an example and not by way of limitation, a profile page corresponding to a particular external webpage may be the particular external webpage and the profile page may correspond to a particular concept node 904. Profile pages may be viewable by all or a selected subset of other users. As an example and not by way of limitation, a user node 902 may have a corresponding user-profile page in which the corresponding user may add content, make declarations, or otherwise express himself or herself. As another example and not by way of limitation, a concept node 904 may have a corresponding concept-profile page in which one or more users may add content, make declarations, or express themselves, particularly in relation to the concept corresponding to concept node 904.

In particular embodiments, a concept node 904 may represent a third-party webpage or resource hosted by a third-party system 870. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 830 to send to social-networking system 860 a message indicating the user's action. In response to the message, social-networking system 860 may create an edge (e.g., a check-in-type edge) between a user node 902 corresponding to the user and a concept node 904 corresponding to the third-party webpage or resource and store edge 906 in one or more data stores.

In particular embodiments, a pair of nodes in social graph 900 may be connected to each other by one or more edges 906. An edge 906 connecting a pair of nodes may represent a relationship between the pair of nodes. In particular embodiments, an edge 906 may include or represent one or more data objects or attributes corresponding to the relationship between a pair of nodes. As an example and not by way of limitation, a first user may indicate that a second user is a "friend" of the first user. In response to this indication, social-networking system 860 may send a "friend request" to the second user. If the second user confirms the "friend request," social-networking system 860 may create an edge 906 connecting the first user's user node 902 to the second user's user node 902 in social graph 900 and store edge 906 as social-graph information in one or more of data stores 864. In the example of FIG. 9, social graph 900 includes an edge 906 indicating a friend relation between user nodes 902 of user "A" and user "B" and an edge indicating a friend relation between user nodes 902 of user "C" and user "B." Although this disclosure describes or illustrates particular edges 906 with particular attributes connecting particular user nodes 902, this disclosure contemplates any suitable edges 906 with any suitable attributes connecting user nodes 902. As an example and not by way of limitation, an edge 906 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 900 by one or more edges 906.

In particular embodiments, an edge 906 between a user node 902 and a concept node 904 may represent a particular action or activity performed by a user associated with user node 902 toward a concept associated with a concept node 904. As an example and not by way of limitation, as illustrated in FIG. 9, a user may "like," "attended," "played," "listened," "cooked," "worked at," or "watched" a concept, each of which may correspond to an edge type or subtype. A concept-profile page corresponding to a concept node 904 may include, for example, a selectable "check in" icon (such as, for example, a clickable "check in" icon) or a selectable "add to favorites" icon. Similarly, after a user clicks these icons, social-networking system 860 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 860 may create a "listened" edge 906 and a "used" edge (as illustrated in FIG. 9) between user nodes 902 corresponding to the user and concept nodes 904 corresponding to the song and application to indicate that the user listened to the song and used the application. Moreover, social-networking system 860 may create a "played" edge 906 (as illustrated in FIG. 9) between concept nodes 904 corresponding to the song and the application to indicate that the particular song was played by the particular application. In this case, "played" edge 906 corresponds to an action performed by an external application (SPOTIFY) on an external audio file (the song "Imagine"). Although this disclosure describes particular edges 906 with particular attributes connecting user nodes 902 and concept nodes 904, this disclosure contemplates any suitable edges 906 with any suitable attributes connecting user nodes 902 and concept nodes 904. Moreover, although this disclosure describes edges between a user node 902 and a concept node 904 representing a single relationship, this disclosure contemplates edges between a user node 902 and a concept node 904 representing one or more relationships. As an example and not by way of limitation, an edge 906 may represent both that a user likes and has used at a particular concept. Alternatively, another edge 906 may represent each type of relationship (or multiples of a single relationship) between a user node 902 and a concept node 904 (as illustrated in FIG. 9 between user node 902 for user "E" and concept node 904 for "SPOTIFY").

In particular embodiments, social-networking system 860 may create an edge 906 between a user node 902 and a concept node 904 in social graph 900. As an example and not by way of limitation, a user viewing a concept-profile page (such as, for example, by using a web browser or a special-purpose application hosted by the user's client system 830) may indicate that he or she likes the concept represented by the concept node 904 by clicking or selecting a "Like" icon, which may cause the user's client system 830 to send to social-networking system 860 a message indicating the user's liking of the concept associated with the concept-profile page. In response to the message, social-networking system 860 may create an edge 906 between user node 902 associated with the user and concept node 904, as illustrated by "like" edge 906 between the user and concept node 904. In particular embodiments, social-networking system 860 may store an edge 906 in one or more data stores. In particular embodiments, an edge 906 may be automatically formed by social-networking system 860 in response to a particular user action. As an example and not by way of limitation, if a first user uploads a picture, watches a movie, or listens to a song, an edge 906 may be formed between user node 902 corresponding to the first user and concept nodes 904 corresponding to those concepts. Although this disclosure describes forming particular edges 906 in particular manners, this disclosure contemplates forming any suitable edges 906 in any suitable manner.

In particular embodiments, social-networking system 860 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 870 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 860 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 860 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 860 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 860 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 860 may calculate a coefficient based on a user's actions. Social-networking system 860 may monitor such actions on the online social network, on a third-party system 870, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 860 may calculate a coefficient based on the user's actions with particular types of content. The content may be associated with the online social network, a third-party system 870, or another suitable system. The content may include users, profile pages, posts, news stories, headlines, instant messages, chat room conversations, emails, advertisements, pictures, video, music, other suitable objects, or any combination thereof. Social-networking system 860 may analyze a user's actions to determine whether one or more of the actions indicate an affinity for subject matter, content, other users, and so forth. As an example and not by way of limitation, if a user frequently posts content related to "coffee" or variants thereof, social-networking system 860 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 860 may calculate a coefficient based on the type of relationship between particular objects. Referencing the social graph 900, social-networking system 860 may analyze the number and/or type of edges 906 connecting particular user nodes 902 and concept nodes 904 when calculating a coefficient. As an example and not by way of limitation, user nodes 902 that are connected by a spouse-type edge (representing that the two users are married) may be assigned a higher coefficient than a user nodes 902 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in a first photo, but merely likes a second photo, social-networking system 860 may determine that the user has a higher coefficient with respect to the first photo than the second photo because having a tagged-in-type relationship with content may be assigned a higher weight and/or rating than having a like-type relationship with content. In particular embodiments, social-networking system 860 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 860 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 900. As an example and not by way of limitation, social-graph entities that are closer in the social graph 900 (i.e., fewer degrees of separation) may have a higher coefficient than entities that are further apart in the social graph 900.

In particular embodiments, social-networking system 860 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 830 of the user). A first user may be more interested in other users or concepts that are closer to the first user. As an example and not by way of limitation, if a user is one mile from an airport and two miles from a gas station, social-networking system 860 may determine that the user has a higher coefficient for the airport than the gas station based on the proximity of the airport to the user.

In particular embodiments, social-networking system 860 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 860 may provide information that is relevant to user's interests and current circumstances, increasing the likelihood that they will find such information of interest. In particular embodiments, social-networking system 860 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 860 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 860 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 870 (e.g., via an API or other communication channel), or from another suitable system. In response to the request, social-networking system 860 may calculate the coefficient (or access the coefficient information if it has previously been calculated and stored). In particular embodiments, social-networking system 860 may measure an affinity with respect to a particular process. Different processes (both internal and external to the online social network) may request a coefficient for a particular object or set of objects. Social-networking system 860 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

In particular embodiments, an advertisement may be text (which may be HTML-linked), one or more images (which may be HTML-linked), one or more videos, audio, other suitable digital object files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on social-networking system 860). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social-networking system 860 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social-networking system 860) or RSVP (e.g., through social-networking system 860) to an event associated with the advertisement. In addition or as an alternative, an advertisement may include social-networking-system content directed to the user. As an example and not by way of limitation, an advertisement may display information about a friend of the user within social-networking system 860 who has taken an action associated with the subject matter of the advertisement.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 904 corresponding to a particular photo may have a privacy setting specifying that the photo may only be accessed by users tagged in the photo and their friends. In particular embodiments, privacy settings may allow users to opt in or opt out of having their actions logged by social-networking system 860 or shared with other systems (e.g., third-party system 870). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 870, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 862 may be authorization/privacy servers for enforcing privacy settings. In response to a request from a user (or other entity) for a particular object stored in a data store 864, social-networking system 860 may send a request to the data store 864 for the object. The request may identify the user associated with the request and may only be sent to the user (or a client system 830 of the user) if the authorization server determines that the user is authorized to access the object based on the privacy settings associated with the object. If the requesting user is not authorized to access the object, the authorization server may prevent the requested object from being retrieved from the data store 864, or may prevent the requested object from being sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Figure 10:
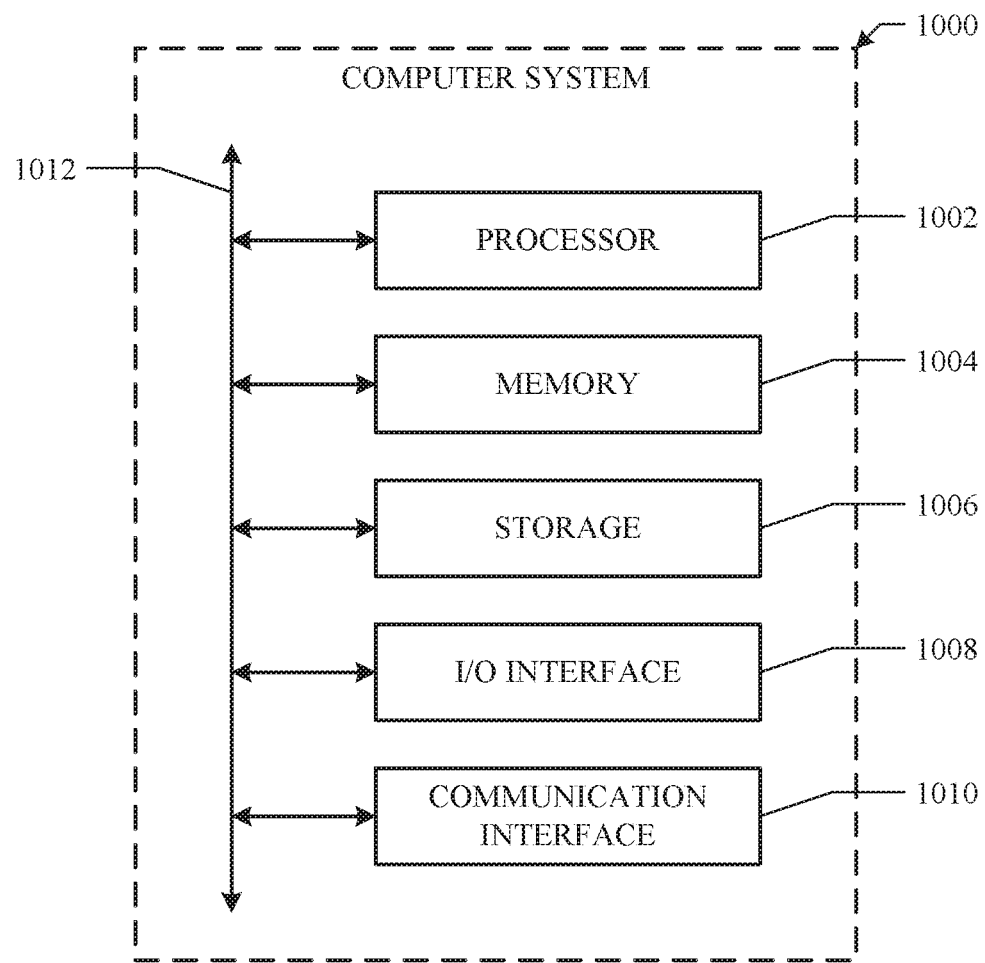
FIG. 10 illustrates an example computer system.

FIG. 10 illustrates an example computer system 1000. In particular embodiments, one or more computer systems 1000 perform one or more steps of one or more methods described or illustrated herein. In particular embodiments, one or more computer systems 1000 provide functionality described or illustrated herein. In particular embodiments, software running on one or more computer systems 1000 performs one or more steps of one or more methods described or illustrated herein or provides functionality described or illustrated herein. Particular embodiments include one or more portions of one or more computer systems 1000. Herein, reference to a computer system may encompass a computing device, and vice versa, where appropriate. Moreover, reference to a computer system may encompass one or more computer systems, where appropriate.

This disclosure contemplates any suitable number of computer systems 1000. This disclosure contemplates computer system 1000 taking any suitable physical form. As example and not by way of limitation, computer system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1000 may include one or more computer systems 1000; be unitary or distributed; span multiple locations; span multiple machines; span multiple data centers; or reside in a cloud, which may include one or more cloud components in one or more networks. Where appropriate, one or more computer systems 1000 may perform without substantial spatial or temporal limitation one or more steps of one or more methods described or illustrated herein. As an example and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

In particular embodiments, computer system 1000 includes a processor 1002, memory 1004, storage 1006, an input/output (I/O) interface 1008, a communication interface 1010, and a bus 1012. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1002 includes hardware for executing instructions, such as those making up a computer program. As an example and not by way of limitation, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006. In particular embodiments, processor 1002 may include one or more internal caches for data, instructions, or addresses. This disclosure contemplates processor 1002 including any suitable number of any suitable internal caches, where appropriate. As an example and not by way of limitation, processor 1002 may include one or more instruction caches, one or more data caches, and one or more translation lookaside buffers (TLBs). Instructions in the instruction caches may be copies of instructions in memory 1004 or storage 1006, and the instruction caches may speed up retrieval of those instructions by processor 1002. Data in the data caches may be copies of data in memory 1004 or storage 1006 for instructions executing at processor 1002 to operate on; the results of previous instructions executed at processor 1002 for access by subsequent instructions executing at processor 1002 or for writing to memory 1004 or storage 1006; or other suitable data. The data caches may speed up read or write operations by processor 1002. The TLBs may speed up virtual-address translation for processor 1002. In particular embodiments, processor 1002 may include one or more internal registers for data, instructions, or addresses. This disclosure contemplates processor 1002 including any suitable number of any suitable internal registers, where appropriate. Where appropriate, processor 1002 may include one or more arithmetic logic units (ALUs); be a multi-core processor; or include one or more processors 1002. Although this disclosure describes and illustrates a particular processor, this disclosure contemplates any suitable processor.

In particular embodiments, memory 1004 includes main memory for storing instructions for processor 1002 to execute or data for processor 1002 to operate on. As an example and not by way of limitation, computer system 1000 may load instructions from storage 1006 or another source (such as, for example, another computer system 1000) to memory 1004. Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results (which may be intermediate or final results) to the internal register or internal cache. Processor 1002 may then write one or more of those results to memory 1004. In particular embodiments, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere). One or more memory buses (which may each include an address bus and a data bus) may couple processor 1002 to memory 1004. Bus 1012 may include one or more memory buses, as described below. In particular embodiments, one or more memory management units (MMUs) reside between processor 1002 and memory 1004 and facilitate accesses to memory 1004 requested by processor 1002. In particular embodiments, memory 1004 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1004 may include one or more memories 1004, where appropriate. Although this disclosure describes and illustrates particular memory, this disclosure contemplates any suitable memory.

In particular embodiments, storage 1006 includes mass storage for data or instructions. As an example and not by way of limitation, storage 1006 may include a hard disk drive (HDD), a floppy disk drive, flash memory, an optical disc, a magneto-optical disc, magnetic tape, or a Universal Serial Bus (USB) drive or a combination of two or more of these. Storage 1006 may include removable or non-removable (or fixed) media, where appropriate. Storage 1006 may be internal or external to computer system 1000, where appropriate. In particular embodiments, storage 1006 is non-volatile, solid-state memory. In particular embodiments, storage 1006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 may include one or more storage control units facilitating communication between processor 1002 and storage 1006, where appropriate. Where appropriate, storage 1006 may include one or more storages 1006. Although this disclosure describes and illustrates particular storage, this disclosure contemplates any suitable storage.

In particular embodiments, I/O interface 1008 includes hardware, software, or both, providing one or more interfaces for communication between computer system 1000 and one or more I/O devices. Computer system 1000 may include one or more of these I/O devices, where appropriate. One or more of these I/O devices may enable communication between a person and computer system 1000. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1008 for them. Where appropriate, I/O interface 1008 may include one or more device or software drivers enabling processor 1002 to drive one or more of these I/O devices. I/O interface 1008 may include one or more I/O interfaces 1008, where appropriate. Although this disclosure describes and illustrates a particular I/O interface, this disclosure contemplates any suitable I/O interface.

In particular embodiments, communication interface 1010 includes hardware, software, or both providing one or more interfaces for communication (such as, for example, packet-based communication) between computer system 1000 and one or more other computer systems 1000 or one or more networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1010 for it. As an example and not by way of limitation, computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1000 may include any suitable communication interface 1010 for any of these networks, where appropriate. Communication interface 1010 may include one or more communication interfaces 1010, where appropriate. Although this disclosure describes and illustrates a particular communication interface, this disclosure contemplates any suitable communication interface.

In particular embodiments, bus 1012 includes hardware, software, or both coupling components of computer system 1000 to each other. As an example and not by way of limitation, bus 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1012 may include one or more buses 1012, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
   by a computing device, receiving a request, from a client system of a first user of an online social network, to access a marketplace comprising a plurality of products offered for sale by a second user of the online social network;
   by the computing device, accessing a content interaction history of the first user in response to receiving the request;
   by the computing device, filtering a set of product listings based on comparing a plurality of respective product-listing embeddings and a content-interaction embedding associated with the first user, wherein each of the product listings comprises a description of one of the products in the marketplace, wherein each product-listing embedding is a vector representation of a corresponding product listing mapped to a first embedding space and the content-interaction embedding is a vector representation of the content interaction history of the first user mapped to a second embedding space, wherein the second embedding space maps to the first embedding space;
   by the computing device, ranking each product listing in the filtered set based at least on a product-score representing a likelihood of the first user interacting with the respective product, the product-score being based on interaction information associated with the first user, product information associated with the product, and sparse information associated with the first user; and
   by the computing device, sending, to the client system of the first user, a subset of the ranked product listings having a rank that satisfies a threshold.

2. The method of claim 1, further comprising:
   generating the content-interaction embedding associated with the first user based on the content interaction history associated with the first user.

3. The method of claim 2, further comprising:
   generating the content-interaction embedding on a periodic basis.

4. The method of claim 1, wherein the content interaction history comprises:
   user demographic information associated with the first user;
   an image interaction history associated with the first user; or
   a text interaction history associated with the first user.

5. The method of claim 1, further comprising:
   generating one or more product-listing embeddings associated with one or more product listings, respectively, based on content associated with each of the respective product listings.

6. The method of claim 5 further comprising:
   generating the product-listing embedding for a particular product listing when the particular product listing is submitted to the marketplace or when the particular product listing is updated.

7. The method of claim 5, wherein the content associated with each product listing comprises one or more text items; and
   the generating the product-listing embedding for a particular product-listing comprises parsing each of the one or more text items associated with the particular product listing into one or more n-grams.

8. The method of claim 5, wherein the content associated with each product listing comprises one or more images; and
   the generating the product-listing embedding for a particular product listing comprises performing feature recognition on the one or more images associated with the particular product listing.

9. The method of claim 1, wherein the plurality of product-listing embeddings and the content-interaction embedding are generated by respective machine-learning-generated models.

10. The method of claim 9, wherein the machine-learning-generated models are trained using a rank-loss training methodology.

11. The method of claim 1, wherein the filtering the set of product listings comprises:
for each of the product listings, computing a dot product of the content-interaction embedding and the respective product-listing embedding to generate a filter value; and
removing from the set of product listings one or more product listings having a filter value that does not satisfy a threshold filter value.

12. The method of claim 1, wherein the product-score comprises a weighted combination of a plurality of calculated probabilities, each of the calculated probabilities representing a likelihood of the first user initiating a particular interaction with the respective product listing.

13. The method of claim 1, wherein the product information associated with each product listing comprises an interaction history associated with the product or a product category.

14. The method of claim 1, wherein the interaction information associated with the first user comprises:
a content interaction history associated with the first user;
a user-category interaction history associated with the first user;
a user-group interaction history associated with the first user;
a user-content interaction history associated with the first user; or
a similar-product interaction history associated with the first user.

15. The method of claim 1, wherein the sparse information associated with the first user comprises user engagement information wherein a number of possible engagement recipients is substantially larger than a number of engagement recipients with whom the first user has engaged.

16. The method of claim 1, wherein the ranking is performed by a machine-learning-generated model.

17. One or more computer-readable non-transitory storage media comprising software that is operable when executed to:
receive a request, from a client system of a first user of an online social network, to access a marketplace comprising a plurality of products offered for sale by a second user of the online social network;
access a content interaction history of the first user in response to receiving the request;
filter a set of product listings based on comparing a plurality of respective product-listing embeddings and a content-interaction embedding associated with the first user, wherein each of the product listings comprises a description of one of the products in the marketplace, wherein each product-listing embedding is a vector representation of a corresponding product listing mapped to a first embedding space and the content-interaction embedding is a vector representation of the content interaction history of the first user mapped to a second embedding space, wherein the second embedding space maps to the first embedding space;
rank each product listing in the filtered set based at least on a product-score representing a likelihood of the first user interacting with the respective product, the product-score being based on interaction information associated with the first user, product information associated with the product, and sparse information associated with the first user; and
send, to the client system of the first user, a subset of the ranked product listings having a rank that satisfies a threshold.

18. The media of claim 17, wherein the software is further operable when executed to generate the content-interaction embedding associated with the first user based on the content interaction history associated with the first user.

19. A system comprising:
one or more processors; and
one or more computer-readable non-transitory storage media coupled to one or more of the processors and comprising instructions operable when executed by one or more of the processors to cause the system to:
receive a request, from a client system of a first user of an online social network, to access a marketplace comprising a plurality of products offered for sale by a second user of the online social network;
access a content interaction history of the first user in response to receiving the request;
filter a set of product listings based on comparing a plurality of respective product-listing embeddings and a content-interaction embedding associated with the first user, wherein each of the product listings comprises a description of one of the products in the marketplace, wherein each product-listing embedding is a vector representation of a corresponding product listing mapped to a first embedding space and the content-interaction embedding is a vector representation of the content interaction history of the associated user mapped to a second embedding space, wherein the second embedding space maps to the first embedding space;
rank each product listing in the filtered set based at least on a product-score representing a likelihood of the first user interacting with the respective product, the product-score being based on interaction information associated with the first user, product information associated with the product, and sparse information associated with the first user; and
send, to the client system of the first user, a subset of the ranked product listings having a rank that satisfies a threshold.

20. The system of claim 19, wherein the instructions are further operable when executed by one or more of the processors to cause the system to generate the content-interaction embedding associated with the first user based on the content interaction history associated with the first user.

* * * * *